United States Patent
Smedberg et al.

(10) Patent No.: US 12,234,308 B2
(45) Date of Patent: *Feb. 25, 2025

(54) POLYETHYLENE WITH A HIGH VINYL CONTENT AND BENEFICIAL RHEOLOGICAL PROPERTIES

(71) Applicant: BOREALIS AG, Vienna (AT)

(72) Inventors: Annika Smedberg, Stenungsund (SE); Villgot Englund, Stenungsund (SE); Emil Hjärtfors, Stenungsund (SE)

(73) Assignee: BOREALIS AG, Vienna (AT)

(*) Notice: Subject to any disclaimer, the term of this patent is extended or adjusted under 35 U.S.C. 154(b) by 52 days.

This patent is subject to a terminal disclaimer.

(21) Appl. No.: 16/770,707

(22) PCT Filed: Dec. 18, 2018

(86) PCT No.: PCT/EP2018/085564
§ 371 (c)(1),
(2) Date: Jun. 8, 2020

(87) PCT Pub. No.: WO2019/121731
PCT Pub. Date: Jun. 27, 2019

(65) Prior Publication Data
US 2021/0163644 A1 Jun. 3, 2021

(30) Foreign Application Priority Data
Dec. 18, 2017 (EP) .................... 17208192

(51) Int. Cl.
*C08F 210/18* (2006.01)
*C08L 23/06* (2006.01)
*H01B 3/44* (2006.01)

(52) U.S. Cl.
CPC ............ *C08F 210/18* (2013.01); *C08L 23/06* (2013.01); *H01B 3/441* (2013.01); *C08L 2203/202* (2013.01); *C08L 2203/30* (2013.01); *C08L 2207/066* (2013.01); *C08L 2312/00* (2013.01)

(58) Field of Classification Search
CPC ...... C08F 10/02; C08F 110/02; C08F 210/02; C08F 210/18; C08F 2500/28; C08L 23/06; C08L 23/08; C08L 23/083
See application file for complete search history.

(56) References Cited

U.S. PATENT DOCUMENTS

| | | | |
|---|---|---|---|
| 5,539,075 A | 7/1996 | Gustafsson et al. | |
| 2019/0366696 A1* | 12/2019 | Scala | B32B 27/32 |

FOREIGN PATENT DOCUMENTS

| | | |
|---|---|---|
| EP | 1699882 B1 | 9/2009 |
| EP | 2318210 B1 | 4/2014 |
| WO | 9308222 | 4/1993 |
| WO | 9635732 | 11/1996 |
| WO | 2010003649 A1 | 1/2010 |
| WO | 2010003651 A1 | 1/2010 |
| WO | 2015090642 A1 | 6/2015 |

OTHER PUBLICATIONS

Freymond, C. et al. Polymer Testing vol. 106 (Year: 2021).*
International Search Report and Written Opinion dated Jan. 24, 2019, from International Application No. PCT/EP2018/085564, 12 pages.
Encyclopedia of Polymer Science and Engineering, 1986, vol. 6, p. 383-410.
International Search Report and Written Opinion dated Jan. 1, 2019, from International Application No. PCT/EP2018/085560, 11 pages.

* cited by examiner

*Primary Examiner* — John M Cooney
*Assistant Examiner* — Jeffrey S Lenihan
(74) *Attorney, Agent, or Firm* — Meunier Carlin & Curfman LLC

(57) ABSTRACT

The invention relates to a polyethylene which contains a total amount of vinyl groups which is B vinyl groups per 1000 carbon atoms, and $B_1 \leq B$, wherein $B_1$ is 0.30; and has a complex viscosity ($\eta^*$) at 0.05 rad/sec, which is X Pas, and $X_1 \leq X \leq X_2$, wherein $X_1$ is 10000 and $X_2$ is 30000; and has a complex viscosity ($\eta^*$) at 300 rad/sec, which is Y Pas, and $Y_1 \leq Y \leq Y_2$, wherein $Y_1$ is 5 and $Y_2$ is 350, both complex viscosities ($\eta^*$) are determined according to method ISO 6721-1 on stabilised samples of the polyethylene, a polymer composition, an article being e.g. a cable, e.g. a power cable, and processes for producing a polyethylene, a polymer composition and an article, and an article; useful in different end applications, such as wire and cable (W&C) applications.

11 Claims, No Drawings

POLYETHYLENE WITH A HIGH VINYL CONTENT AND BENEFICIAL RHEOLOGICAL PROPERTIES

FIELD OF INVENTION

The invention relates to a polyethylene, a polymer composition, an article, e.g. comprising layer(s), e.g. insulating layer(s), which is/are obtained from the polyethylene or the polymer composition, the article may be a cable, e.g. a power cable, a process for producing an article which comprises use of a polymer composition, and processes for producing a polyethylene and a polymer composition. The polyethylene, and polymer compositions comprising it, may be useful in different end applications, such as wire and cable (W&C) applications, especially in cable applications, such as power cable applications, e.g., in medium voltage (MV) and, for example, in high voltage (HV) and, for example, e.g., extra high voltage (EHV) cable applications. Further, the polyethylene, and polymer compositions comprising it, may be useful in both alternating current (AC) and direct current (DC) applications.

BACKGROUND ART

Polyethylenes produced in a high pressure (HP) process are widely used in demanding polymer applications wherein the polymers must meet high mechanical and/or electrical requirements. For instance in W&C applications, e.g. power cable applications, e.g., in LV, MV, in HV and EHV applications, the mechanical and the electrical properties of polyethylenes, and of polymer compositions comprising polyethylenes, have significant importance.

For instance in power cable applications, particularly in MV and especially in HV, and EHV cable applications, the electrical properties of the polymer composition have a significant importance. Furthermore, the electrical properties, which are of importance, may differ in different cable applications, as is the case between AC and DC cable applications.

Further, it is also known that crosslinking of polymers, e.g. polyethylenes, substantially contributes to an improved heat and deformation resistance, mechanical strength, chemical resistance and abrasion resistance of a polymer. Therefore crosslinked polymers are widely used in different end applications, such as in the mentioned wire and cable (W&C) applications.

Furthermore, in cable applications, an electric conductor is usually coated first with an inner semiconducting layer, followed by an insulating layer and an outer semiconducting layer. To these layers, further layer(s) may be added, such as screen(s) and/or auxiliary barrier layer(s), e.g. one or more water barrier layer(s) and one or more jacketing layer(s).

Due to benefits, mentioned herein, which are achievable with crosslinking, the insulating layer and the semiconducting layers in cable applications are typically made using crosslinkable polymer compositions. The polymer compositions in a formed layered cable application are then crosslinked.

Furthermore, such crosslinkable polymer compositions comprising low density polyethylene (LDPE), are today among the predominant cable insulating materials for power cables.

The crosslinking can be performed with crosslinking agents where the crosslinking agents decompose generating free radicals. Such crosslinking agents, e.g. peroxides, are conventionally added to the polymeric material prior to, or during, the extrusion of the cable. Said crosslinking agent should preferably remain stable during the extrusion step. The extrusion step should preferably be performed at a temperature low enough to minimize the early decomposition of the crosslinking agent, but high enough to obtain proper melting and homogenisation of the polymer composition. If a significant amount of crosslinking agent, e.g. peroxide, decomposes already in the extruder, and thereby initiates premature crosslinking, it will result in formation of, so-called, "scorch", i.e. inhomogeneity, surface unevenness and possibly discolouration in the different layers of the resultant cable. Therefore, any significant decomposition of crosslinking agents, i.e. free radical forming agents, during extrusion should be avoided. Instead, the crosslinking agents should ideally decompose merely in a subsequent crosslinking step at elevated temperature. The elevated temperature will increase the decomposition rate of the crosslinking agents and will thus increase crosslinking speed, and a desired, i.e. a target, crosslinking degree may be reached faster.

Moreover, when a polymer composition in, for example, a cable, is crosslinked, the decomposition of the crosslinking agents, e.g. peroxides, during the crosslinking, will further also result in formation of peroxide decomposition products. Some of the peroxide decomposition products are volatile, and their main component is methane if the types of peroxides that typically are used for crosslinking in relation to, for example, a cable, are used. The peroxide decomposition products remain mostly captured within the polymer composition of, for example, a cable, after crosslinking. This causes, e.g. problems in view of the cable manufacturing process as well as in view of the quality of the final cable.

Especially MV, HV and EHV power cables must have layers of high quality in order to help safety during installation and in end uses of said cables. In installation, for example, it is of importance to avoid that captured decomposition products e.g. flammable methane, ignite, for example when end caps are removed. In service, volatile peroxide decomposition products formed in a cable during a crosslinking step can create a gas pressure and thus cause defects in the shielding and in the joints. E.g. when a cable core is equipped with a metal barrier, then the gaseous products can exert a pressure, especially on the joints and terminations, whereby a system failure may occur. Thus, the level of these volatile peroxide decomposition products needs to be reduced, to a low enough level, before subsequent cable production steps can take place.

A low enough level of the volatile peroxide decomposition products renders a use of the polymer composition comprising LDPE safe for use in installations, such as cable installations, and with accessories, such as cable accessories. Thus, today a, so called, degassing step, which reduces the volatile peroxide decomposition products, is needed in cable production. The degassing step is a time and energy consuming and thus costly operation in a cable manufacturing process. Degassing requires large heated chambers which must be well ventilated to avoid the build-up of e.g. flammable methane. The cable core, i.e. layers and conductor, typically wound to cable drums, is normally held in said degassing step in elevated temperature in the range of 50-80° C., e.g. 60-70° C., for lengthy time periods. When exposed to the required temperatures thermal expansion and softening of the insulation can occur and lead to unwanted deformation of the formed cable layers resulting directly to failures of the cable. The degassing of HV and EHV cables with high cable weight needs thus often to be carried out at decreased temperatures which prolongs the degassing time further. Accordingly, there is a need to find new solutions to overcome the problems of the state of the art.

Further, the crosslinking of a polymer composition, comprised, in, for example, a cable, substantially contributes, to the improved heat and deformation resistance, mechanical strength, chemical resistance and abrasion resistance of the polymer composition and the cable comprising the polymer composition.

In this context see U.S. Pat. No. 5,539,075, which relates to a method of producing an unsaturated copolymer of ethylene and at least one monomer, wherein the monomer is a polyunsaturated compound and copolymerisable with ethylene.

See also EP2318210B1, which relates to a polymer composition comprising an unsaturated LDPE copolymer of ethylene with one or more polyunsaturated comonomers and being suitable for crosslinked polymer applications. The polymer composition has a melt flow rate under 2.16 kg load, $MFR_2$, of at least 2.8 g/10 min, and contains carbon-carbon double bonds in an amount of at least 0.40 carbon-carbon double bonds/1 000 carbon atoms.

Additionally, different materials, i.e. polyethylenes and polymer compositions comprising polyethylenes, may be needed for different cables, cable constructions and lines. Moreover, it is not possible to run all cables or cable constructions on all cable lines using, a, herein so called, standard viscosity "crosslinked" (here, more correctly, meaning "crosslinkable") polyethylene (XLPE) materials having melt flow rate under 2.16 kg load, $MFR_2$, values around 2 g/10 min. That is because of that these standard viscosity XLPE materials do not have sufficient sagging resistance. The insufficiency in sagging resistance is normally solved, in the case of a cable, by using materials with $MFR_2$ values lower than 2 g/10 min. Materials, which have $MFR_2$ values lower than 2 g/10 min, have high viscosity and improved sagging resistance. The improved sagging resistance is needed for big cable constructions and for cable production in catenary cable lines, as well as, for cable production in horizontal cable lines. For example, in horizontal continuous vulcanization lines, e.g. a Mitsubishi Dainichi Continuous Vulcanization (MDCV) line, and in catenary continuous vulcanization (CCV) lines (especially for thicker constructions) for producing cables, it is typically required to use polymeric materials, e.g., for insulation layers, which have lower $MFR_2$ compared to the $MFR_2$ of polymeric materials (e.g. standard viscosity XLPE materials) used in vertical continuous vulcanization (VCV) lines and CCV lines (for thinner constructions).

In horizontal continuous vulcanization lines for producing cables, the conductor may sink within the insulation layer, if polymeric materials which have a too high $MFR_2$ are used, the sinking of the conductor may also result in an eccentricity of the conductor in the cable core and/or eccentricity of the cable core.

Likewise in CCV lines, if polymeric materials which have a too high $MFR_2$, i.e. also having a too low sagging resistance, are used, the wall thickness may become too large as soft molten polymeric material of an insulation layer may drop off the conductor. This will result in a downward displacement of the insulation layer, thus rendering an eccentricity, e.g. a, so called, pear shaped cable core.

Further, the insufficiency in the sagging resistance may be counteracted by different methods, such as:
    using eccentric tools in the extruder head to compensate for the effect of sinking of the conductor;
    twisting of the cable core to counter act displacement of the conductor, using of a double rotating technique to counteract the pear shaping, and, also, using a, so-called, entry heat treatment (EHT).

Accordingly, polymeric materials having a comparably lower $MFR_2$ and higher viscosity, as already described, are normally used to counteract these sagging behaviors.

However, materials having high viscosity will generate a higher melt temperature at commonly used extrusion conditions which may lead to higher risk for premature crosslinking and, thus, formation of prematurely crosslinked matter, i.e. "scorch". "Scorch" may, as already described herein, be inhomogeneity, surface unevenness and/or possibly discolouration in the different layers of, for example, the resulting cable. The formation of "scorch" may have severe impact on productivities in the cable lines, as it significantly limits the production length before cleaning is needed and therefore the production rate is reduced. Thus, when producing a cable, by using polymeric materials having a lower $MFR_2$ generating a higher temperature in the melt, a lower production speed is required to reduce the melt temperature and thereby minimizing "scorch".

Accordingly, a drawback with decreasing the $MFR_2$ value of a material may thus be that it also requires changes in processing conditions such as the lowering of the production speed.

The processing conditions are, besides the sagging resistance, also properties that are of importance in relation to crosslinkable XLPE materials, such as peroxide crosslinkable XLPE materials. Ideally, the material shall have low viscosity under the extrusion step of the process in order to have an, under the extrusion step, desirably low melt temperature. On the other hand, in the crosslinking step of the process a comparably higher viscosity of the material may be desirable. If a crosslinkable XLPE material generates a low melt temperature, there is less risk for "scorch" formation during an extrusion of, e.g., a cable construction, as compared with an extrusion involving another crosslinkable XLPE material generating a higher temperature in the melt.

The sagging resistance and the viscosity under processing conditions may both be visualised by viscosity curves obtained in plate-plate rheology measurements. Said sagging resistance is, then, visualised via the complex viscosity ($\eta^*$) at very low shear rates, i.e. $\eta^*_0$ and $\eta^*_{0.05}$ at 0 rad/sec and 0.05 rad/sec, respectively, and said viscosity under processing conditions is, then, visualised via the complex viscosity $\eta^*_{300}$ at 300 rad/sec.

Still a further important property for XLPE is the crosslinking degree where a target crosslinking degree level shall be reached with, optimally, as low amount of crosslinking agent, such as peroxide, as possible. The degree of crosslinking may, for example, be measured with the, so-called, hot set test. In accordance with said hot set test, the lower the hot set elongation value, the more crosslinked is the material. An, as low as possible, amount of the crosslinking agent reduces the volatile peroxide decomposition products and also reduces time needed for degassing.

The extrusion and the crosslinking steps of a polymeric material included in, for example, cable production have different requirements. The critical parameter for the extrusion step is, as already described, that the polymeric material generates a low melt temperature in order to reduce the risk for "scorch". This is governed by the rheological properties in the region of shear rate that the polymeric material is exhibiting in the extruder, for example, using a low complex viscosity ($\eta^*$) at 300 rad/sec. The low complex viscosity ($\eta^*$) at 300 rad/sec is generally connected to a polymeric material having a higher melt flow rate ($MFR_2$).

However, an increase in melt flow rate must often be balanced as a polymeric material with a high $MFR_2$ has a too low sagging resistance which will result in, for example, a non-centric cable, which is not acceptable. The rheological property that is influencing the sagging resistance is the complex viscosity ($\eta^*$) at very low shear rates, such as, at 0 rad/sec. However, the complex viscosity ($\eta^*$) at 0 rad/sec is an extrapolated value, and thus here a measured complex viscosity ($\eta^*$) at 0.05 rad/sec is used instead.

Accordingly, there is a need to find new solutions to overcome the problems of the state of the art.

DESCRIPTION OF THE INVENTION

The present invention relates to a polyethylene, wherein the polyethylene contains a total amount of vinyl groups which is B vinyl groups per 1000 carbon atoms, and $B_1 \le B$, wherein $B_1$ is 0.30, determined according to method ASTM D6248-98; and has a complex viscosity ($\eta^*$) at 0.05 rad/sec, which is X Pas, and $X_1 \le X \le X_2$, wherein $X_1$ is 10000 and $X_2$ is 30000; and a complex viscosity ($\eta^*$) at 300 rad/sec, which is Y Pas, and $Y_1 \le Y \le Y_2$, wherein $Y_1$ is 5 and $Y_2$ is 350, both complex viscosities ($\eta^*$) are determined according to method ISO 6721-1 on stabilised samples of the polyethylene.

According to the present invention the polyethylene contains a total amount of vinyl groups which is B vinyl groups per 1000 carbon atoms, and $B_1 \le B$, wherein $B_1$ is 0.30, determined according to method ASTM D6248-98, see details with regard to method ASTM D6248-98 under Determination Methods herein.

The polyethylene according to the present invention has a complex viscosity ($\eta^*$) at 0.05 rad/sec, which is X Pas, and $X_1 \le X \le X_2$, wherein $X_1$ is 10000 and $X_2$ is 30000, and a complex viscosity ($\eta^*$) at 300 rad/sec, which is Y Pas, and $Y_1 \le Y \le Y_2$, wherein $Y_1$ is 5 and $Y_2$ is 350, both complex viscosities ($\eta^*$) are determined according to method ISO 6721-1 on stabilised samples of the polyethylene, see details with regard to method ISO 6721-1 in Rheology, dynamic (Viscosity) method ISO 6721-1 under Determination Methods herein.

The complex viscosity ($\eta^*$) at 0.05 rad/sec, which is X Pas, here visualises the sagging resistance, and the complex viscosity ($\eta^*$) at 300 rad/sec, which is Y Pas, here visualises the viscosity under processing conditions.

The polyethylene, as described herein, comprises vinyl groups, for example, allyl groups. Vinyl groups are functional groups which comprise carbon double bonds. Further, the polyethylene may in addition comprise other functional groups also comprising carbon carbon double bonds. The other functional groups, also comprising carbon carbon double bonds, may be, e.g., vinylidene groups and/or vinylene groups. The vinylene group has either a cis or trans configuration.

The polyethylene according to the present invention, as defined herein, surprisingly combines, in one polymer, i.e. in the polyethylene according to the present invention:

good processability, e.g. a good flowability which is generally only associated with polymers having a comparably higher $MFR_2$, with excellent sagging resistance generally only associated with polymers having a comparably lower $MFR_2$.

Further, that the polymer, i.e. said polyethylene, combines excellent sagging properties with good processability, e.g. flowability, is also illustrated by the fact that the polyethylene exhibits balanced complex viscosities ($\eta^*$) at 300 rad/sec and at 0.05 rad/sec, both complex viscosities ($\eta^*$) are determined according to method ISO 6721-1 on stabilised samples of the polyethylene. The complex viscosity ($\eta^*$) at 300 rad/sec is accordingly low, and the complex viscosity ($\eta^*$) at 0.05 rad/sec is accordingly high, which results in a polymer, i.e. said polyethylene, which has improved processing properties in an extruder, and which still allows generation of a cable, including big cable constructions, with good centricity in cable production for all types of cable lines. Such cables, comprising layers, e.g. insulation layers, being obtained from the polyethylene, may thus accordingly be produced.

Moreover, besides, surprisingly exhibiting the combination excellent sagging properties with good processability, the polyethylene, according to the present invention, has unexpectedly also been shown to enable that a technically desirable level of crosslinking degree is maintained when using crosslinking agents, e.g. peroxides, which are well known in the art, i.e. a technically more desirable level of crosslinking degree in comparison with polyethylenes containing a lower total amount of vinyl groups.

Thus, the polyethylene of the present invention is clearly highly advantageous to be used in, for example, production of crosslinkable and crosslinked articles, for example cables, e.g. cable layers thereof, for example, cable insulation layers.

The polyethylene is suitably used to obtain a polymer composition. Said polymer composition, obtained by using the polyethylene, may be crosslinkable and may thus be highly suitable for producing crosslinkable articles, e.g. one or more crosslinkable layers of a cable, for example one or more crosslinkable insulation layers, of a cable, which layers are subsequently crosslinked.

"Crosslinkable" is a well known expression and means that the polymer composition can be crosslinked, e.g. via radical formation, to form bridges i.a. amongst the polymer chains.

The polyethylene, according to the present invention, which has the comparably lower $MFR_2$, A, has surprisingly been shown to have an improved crosslinking degree in comparison with polyethylenes having a comparably higher $MFR_2$.

Said "total amount of vinyl groups which is B vinyl groups per 1000 carbon atoms" means the "total amount of vinyl groups which is B vinyl groups per 1000 carbon atoms" present in the polyethylene in accordance with the present invention when measured prior to any crosslinking.

The method ASTM D6248-98 for determining the amount of the vinyl groups are described under "Determination Methods".

The $MFR_2$ is determined according to ISO 1133-1:2011 under 2.16 kg load. The determination temperature is chosen, as well known, depending on the type of the polymer used.

The herein exemplified subgroups of the herein described properties, further features, such as further properties or ranges thereof, and exemplified embodiments apply generally to said polyethylene as well as to a polymer composition obtained from the polyethylene, or comprising the polyethylene, to end applications and to any processes thereof, and can be combined in any combination.

Note that the wordings "embodiment" or "embodiments", even if standing alone herein, always relate embodiment of the present invention or embodiments of the present invention.

In embodiments of the present invention, the polyethylene, as described herein, contains B vinyl groups per 1000 carbon atoms, as described herein, wherein $B \leq B_2$, and $B_2$ is 3.0.

In a further embodiment according to the present invention, a polyethylene, as described herein, is disclosed, wherein $B_1$ is 0.35, 0.40 or 0.45.

An even further embodiment of the polyethylene is disclosed, wherein $B_1$ is 0.45.

A further embodiment of the present invention is provided wherein the polyethylene has a melt flow rate at 2.16 kg loading (MFR$_2$), determined according to method ISO 1133-1:2011, which MFR$_2$ is A g/10 min and $A_1 \leq A \leq A_2$; wherein $A_1$ is 0.05 and $A_2$ is 1.70, and contains a total amount of vinyl groups, determined according to method ASTM D6248-98, which is B vinyl groups per 1000 carbon atoms, and $B_1 \leq B$, wherein $B_1$ is 0.45.

Still a further embodiment of the polyethylene is disclosed, wherein $B_1$ is 0.50.

In a further embodiment according to the present invention, a polyethylene, as described herein, is disclosed, wherein $B_1$ is 0.52.

An even further embodiment of the polyethylene is disclosed, wherein $B_1$ is 0.54.

Still a further embodiment of the polyethylene is disclosed, wherein $B_1$ is 0.55.

A further embodiment of the polyethylene is disclosed, wherein $B_1$ is 0.55 and/or $B \leq B_2$, and $B_2$ is 3.0.

An even further embodiment of the polyethylene is disclosed, wherein $B_1$ is 0.60.

Further embodiments of the polyethylene are disclosed, wherein $B_1$ is 0.55, 0.60, 0.65 or 0.70.

Still further embodiments of the polyethylene are disclosed, wherein $B_1$ is 0.53, 0.61, 0.66, 0.71, 0.75, 0.80, 0.82 or 0.84.

Even further embodiments of the polyethylene are disclosed, wherein $B_1$ is 0.75, 0.80, 0.82 or 0.84.

Still a further embodiment of the polyethylene is disclosed, wherein $B_1$ is 0.82.

An even further embodiment of the polyethylene is disclosed, wherein $B_1$ is 0.84.

Still a further embodiment of the polyethylene is disclosed, wherein $B_1$ is 0.86.

In a further embodiment, the polyethylene contains a total amount of vinyl groups (B), wherein $B_1$ is 0.88.

The "amount of vinyl groups" means in this embodiment the "total amount of vinyl groups present in the polyethylene". The term "vinyl group" as used herein takes its conventional meaning, i.e. the moiety "—CH=CH$_2$". Further, the polyethylene may in addition comprise other functional groups also comprising carbon carbon double bonds. The other functional groups, also comprising carbon carbon double bonds, may be, e.g., vinylidene groups and/or vinylene groups. The vinylene group has either a cis or trans configuration. For the avoidance of doubt, vinylidene groups and vinylene groups are not vinyl groups as the terms are used herein. The polyethylene means herein both homopolymer, having been provided with unsaturation by a chain transfer agent, and a copolymer, wherein the unsaturation is provided by polymerising a monomer together with at least a polyunsaturated comonomer, optionally in the presence of a chain transfer agent and, also, optionally in combination with further comonomers.

In one embodiment the polyethylene is an unsaturated copolymer which, as already mentioned herein, comprises one or more polyunsaturated comonomer(s).

Further, said vinyl groups (B) present in the unsaturated copolymer may originate from said polyunsaturated comonomer, a process of producing the polyethylene and, optionally, from any used chain transfer agent.

When the polyethylene of the polymer composition, is an unsaturated copolymer comprising at least one polyunsaturated comonomer, then the polyunsaturated comonomer is straight carbon chain with at least 8 carbon atoms and at least 4 carbon atoms between the non-conjugated double bonds, of which at least one is terminal.

As to suitable polymer materials for the polymer composition, said polyethylene can be any polymer having relevant features, as defined herein, for the polyethylene of the exemplified polymer composition. The polyethylene may be selected from homopolymers of polyethylene as well as copolymers of polyethylene with one or more comonomer(s). The polyethylene can be unimodal or multimodal with respect to molecular weight distribution and/or comonomer distribution, which expressions have a well known meaning.

In one embodiment, the polyethylene is a homopolymer of ethylene.

In an embodiment of the present invention, a polymer composition is disclosed which is obtained by a process comprising the polyethylene.

In an exemplified embodiment the polyethylene is an unsaturated copolymer of polyethylene with at least one polyunsaturated comonomer and optionally with one or more other comonomer(s).

Said unsaturated copolymer of polyethylene is an unsaturated copolymer of ethylene.

In an embodiment of the present invention, a polyethylene, as described herein, is disclosed, which is a copolymer of a monomer with at least one polyunsaturated comonomer and with zero, one or more, for example, zero, one, two or three, other comonomer(s), and wherein said total amount of vinyl groups (B) present in the polyethylene include vinyl groups originating from said at least one polyunsaturated comonomer, e.g. diene.

In an exemplified embodiment the polyethylene is obtained by a process comprising an unsaturated copolymer of ethylene.

Said copolymer of ethylene may be a LDPE copolymer produced in a continuous high pressure polymerisation process, wherein ethylene is copolymerised with at least one polyunsaturated comonomer and optionally with one or more other comonomer(s), optionally in the presence of a chain transfer agent.

The optional further comonomer(s) present in the polyethylene, for example, copolymer of ethylene, is different from the "backbone" monomer and may be selected from an ethylene and higher alpha-olefin(s), e.g. $C_3$-$C_{20}$ alpha-olefin(s), for example, a cyclic alpha-olefin of 5 to 12 carbon or a straight or branched chain alpha-olefin of 3 to 12 carbon atoms, such as propylene, 1-butene, 1-hexene, 1-nonene or 1-octene, as well as, from polar comonomer(s).

In one embodiment the straight or branched chain alpha-olefin is a straight or branched chain alpha-olefin of 3 to 6 carbon atoms.

In a further embodiment the straight chain alpha-olefin is propylene.

It is well known that e.g. propylene can be used as a comonomer or as a chain transfer agent (CTA), or both, whereby it can contribute to the total amount of the vinyl groups, B. Herein, when copolymerisable CTA, such as propylene, is used, the copolymerised CTA is not calculated to the comonomer content.

In an exemplified embodiment, the polyethylene is an unsaturated LDPE polymer, for example, an unsaturated LDPE copolymer comprising at least one comonomer which is a polyunsaturated comonomer (referred herein as LDPE copolymer).

Further, said polyunsaturated comonomer may be a diene, for example, (1) a diene which comprises at least 8 carbon atoms, the first carbon-carbon double bond being terminal and the second carbon-carbon double bond being non-conjugated to the first one (group 1 dienes). Exemplified dienes (1) may be selected from $C_8$ to $C_{14}$ non-conjugated dienes or mixtures thereof, for example, selected from 1,7-octadiene, 1,9-decadiene, 1,11-dodecadiene, 1,13-tetradecadiene, 7-methyl-1,6-octadiene, 9-methyl-1,8-decadiene, or mixtures thereof. In a further embodiment, the diene (1) is selected from 1,7-octadiene, 1,9-decadiene, 1,11-dodecadiene, 1,13-tetradecadiene, or any mixture thereof.

A further embodiment according to the present invention as described herein, is disclosed, wherein the polyethylene is a copolymer of a monomer with at least one polyunsaturated comonomer, wherein the polyunsaturated comonomer is a straight carbon chain with at least 8 carbon atoms and at least 4 carbon atoms between the non-conjugated double bonds, of which at least one is terminal, for example, $C_8$ to $C_{14}$ non-conjugated diene, e.g. selected from 1,7-octadiene, 1,9-decadiene, 1,11-dodecadiene, 1,13-tetradecadiene, or mixtures thereof.

In a preferred embodiment the polyethylene is a copolymer of ethylene and 1,7-octadiene.

Still a further embodiment according to the present invention, as described herein, is disclosed, wherein the polyethylene is an unsaturated LDPE homopolymer or copolymer produced in a continuous high pressure polymerisation process, e.g. a LDPE copolymer of ethylene with one or more polyunsaturated comonomer(s) and with zero, one or more other comonomer(s).

In addition or as an alternative to the dienes (1) listed herein, the diene may also be selected from other types of polyunsaturated dienes (2), such as from one or more siloxane compounds having the following formula (group (2) dienes):

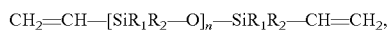

wherein n=1 to 200, and $R_1$ and $R_2$, which can be the same or different, are selected from $C_1$ to $C_4$ alkyl groups and/or $C_1$ to $C_4$ alkoxy groups.

Further, $R_1$ and/or $R_2$ may, for example, be methyl, methoxy or ethoxy. Furthermore, n may, for example, be 1 to 100, e.g., 1 to 50. As an example, divinylsiloxanes, for example, α,ω-divinylsiloxane can be mentioned.

Exemplified polyunsaturated comonomers for the polyethylene are the dienes from group (1) as defined herein. The polyethylene may, for example, be a copolymer of ethylene with at least one diene selected from 1,7-octadiene, 1,9-decadiene, 1,11-dodecadiene, 1,13-tetradecadiene, or any mixture thereof, and optionally with one or more other comonomer(s). It is also exemplified that said polyethylene is the herein-mentioned unsaturated LDPE copolymer. It may comprise further comonomers, e.g. polar comonomer(s), alpha-olefin comonomer(s), non-polar comonomer(s) or any mixture thereof.

As a polar comonomer, compound(s) containing hydroxyl group(s), alkoxy group(s), carbonyl group(s), carboxyl group(s), ether group(s) or ester group(s), or a mixture thereof can used.

Further, a non-polar comonomer, is/are compound(s) not containing hydroxyl group(s), alkoxy group(s), carbonyl group(s), carboxyl group(s), ether group(s) nor ester group(s).

In a further embodiment, compounds containing carboxyl and/or ester group(s) are used and, e.g., the compound is selected from the groups of acrylate(s), methacrylate(s) or acetate(s), or any mixtures thereof.

If present in said unsaturated LDPE copolymer, the polar comonomer may, for example, be selected from the group of alkyl acrylates, alkyl methacrylates or vinyl acetate, or a mixture thereof. Further, said polar comonomers may, for example, be selected from $C_1$- to $C_6$-alkyl acrylates, $C_1$- to $C_6$-alkyl methacrylates or vinyl acetate. Still further, said polar copolymer comprises a copolymer of ethylene with $C_1$- to $C_4$-alkyl acrylate, such as methyl, ethyl, propyl or butyl acrylate, or vinyl acetate, or any mixture thereof. Still further, said polar copolymer preferably comprises a copolymer of ethylene with $C_1$- to $C_4$-alkyl acrylate, such as methyl, ethyl, propyl or butyl acrylate, or any mixture thereof.

The polyethylene, useful in e.g. any herein described polymer composition, can be prepared using i.a. any conventional polymerisation process and equipment, the conventional means as described herein for providing unsaturation and any conventional means for adjusting the $MFR_2$, in order to control and adjust the process conditions to achieve a desired balance between $MFR_2$ and amount of vinyl groups of the polymerised polymer. The unsaturated LDPE polymer as defined herein, e.g. the unsaturated LDPE copolymer, is produced in continuous high pressure reactor, e.g. in continuous high pressure tubular reactor, by free radical initiated polymerisation (referred to as high pressure radical polymerisation). The usable high pressure (HP) polymerisation and the adjustment of process conditions are well known and described in the literature, and can readily be used by a skilled person to provide the herein described inventive balance. Continuous high pressure polymerisation can be performed in a tubular reactor or an autoclave reactor, e.g. in a tubular reactor. One embodiment of continuous HP process is described herein for polymerising ethylene optionally together with one or more comonomer(s), for example, at least with one or more polyunsaturated comonomer(s), in a tubular reactor to obtain a LDPE homopolymer or copolymer as defined herein. The process can be adapted to other polymers as well.

Compression:

Ethylene is fed to a compressor mainly to enable handling of high amounts of ethylene at controlled pressure and temperature. The compressors are usually a piston compressor or diaphragm compressors. The compressor is usually a series of compressors that can work in series or in parallel. Most common is 2-5 compression steps. Recycled ethylene and comonomers can be added at feasible points depending on the pressure. Temperature is typically low, usually in the range of less than 200° C. or less than 100° C. Said temperature may, for example, be less than 200° C.

Tubular Reactor:

The mixture is fed to the tubular reactor. First part of the tube is to adjust the temperature of the fed ethylene; usual temperature is 150-170° C. Then the radical initiator is added. As the radical initiator, any compound or a mixture thereof that decomposes to radicals at an elevated temperature can be used. Usable radical initiators are commercially available. The polymerisation reaction is exothermic. There can be several radical initiator injections points, e.g. 1-5 points, usually provided with separate injection pumps. Also ethylene and optional comonomer(s) can be added at any time during the process, at any zone of the tubular reactor and/or from one or more injection points, as well known. The reactor is continuously cooled e.g. by water or steam. The highest temperature is called peak temperature and the lowest temperature is called radical initiator temperature. The "lowest temperature" means herein the reaction starting temperature which is called the initiation temperature which is "lower" as evident to a skilled person.

Suitable temperatures range from 80 to 350° C. and pressure from 100 to 400 MPa. Pressure can be measured at least in the compression stage and after the tube. Temperature can be measured at several points during all steps. High temperature and high pressure generally increase output. Using various temperature profiles selected by a person skilled in the art will allow control of structure of polymer chain, i.e. Long Chain Branching and/or Short Chain branching, density, MFR, viscosity, Molecular Weight Distribution etc.

The reactor ends conventionally with a valve. The valve regulates reactor pressure and depressurizes the reaction mixture from reaction pressure to separation pressure.
Separation:

The pressure is typically reduced to approx. 10 to 45 MPa, for example to approx. 30 to 45 MPa. The polymer is separated from the unreacted products, for instance gaseous products, such as monomer or the optional comonomer(s), and most of the unreacted products are recovered. Normally low molecular compounds, i.e. wax, are removed from the gas. The pressure can further be lowered to recover and recycle the unused gaseous products, such as ethylene. The gas is usually cooled and cleaned before recycling.

Then the obtained polymer melt is normally mixed and pelletized. Optionally, or in some embodiments, additives can be added in the mixer. Further details of the production of ethylene (co)polymers by high pressure radical polymerisation can be found in the Encyclopedia of Polymer Science and Engineering, Vol. 6 (1986), pp 383-410.

The $MFR_2$ of the polyethylene, e.g. LDPE copolymer, can be adjusted by using e.g. chain transfer agent(s) during the polymerisation, and/or by adjusting reaction temperature or pressure.

When the LDPE copolymer of the invention is prepared, then, as well known, the amount of vinyl groups can be adjusted by polymerising the ethylene e.g. in the presence of one or more polyunsaturated comonomer(s), chain transfer agent(s), or both, using the desired feed ratio between $C_2$ and polyunsaturated comonomer and/or chain transfer agent, depending on the nature and amount of carbon carbon double bonds desired for the LDPE copolymer. I.a. WO 9308222 describes a high pressure radical polymerisation of ethylene with polyunsaturated monomers, such as an α,ω-alkadienes, to increase the unsaturation of an ethylene copolymer. The non-reacted double bond(s) thus provides pendant vinyl groups to the formed polymer chain at the site, where the polyunsaturated comonomer was incorporated by polymerisation. As a result the unsaturation can be uniformly distributed along the polymer chain in random copolymerisation manner. Also e.g. WO 9635732 describes high pressure radical polymerisation of ethylene and a certain type of polyunsaturated α,ω-divinylsiloxanes. Moreover, as known, e.g. propylene can be used as a chain transfer agent to provide double bonds, whereby it can also partly be copolymerised with ethylene.

The alternative unsaturated LDPE homopolymer may be produced analogously to the herein described process conditions as the unsaturated LDPE copolymer, except that ethylene is polymerised in the presence of a chain transfer agent only.

One exemplified polyethylene, e.g. of the LDPE copolymer, of the present invention may have a density, when measured on the polyethylene according to ISO 1183-1 method A:2012, of e.g. higher than 0.860 $g/cm^3$, higher than 0.870, higher than 0.880, higher than 0.885, higher than 0.890, higher than 0.895, higher than 0.900, higher than 0.905, higher than 0.910, or of higher than 0.915 $g/cm^3$.

Another exemplified polyethylene, e.g. of the LDPE copolymer, of the present invention may have a density, when measured on the polyethylene according to ISO 1183-1 method A:2012, of up to 0.960 $g/cm^3$, less than 0.955, less than 0.950, less than 0.945, less than 0.940, less than 0.935, or of less than 0.930 $g/cm^3$.

In a further embodiment the density range, when measured on the polyethylene according to ISO 1183-1 method A:2012, is from 0.915 to 0.930 $g/cm^3$.

Further, said unsaturated copolymer, e.g. the LDPE copolymer, of the polyethylene comprises comonomer(s) in a total amount of up to 45 wt %, e.g. of from 0.05 to 25 wt %, or e.g. from 0.1 to 15 wt %, based on the amount of the polyethylene. Further, said unsaturated copolymer, e.g. the LDPE copolymer, of the polyethylene preferably comprises comonomer(s) in a total amount of 0.1 to 5 wt %, based on the amount of the polyethylene.

An exemplified polyethylene may be comprised in a polymer composition as described herein, wherein the polymer composition is crosslinkable.

In an exemplified embodiment a polymer composition as described herein consists of at least one polyethylene. The polymer composition may also comprise further components such as herein described additives which may be added in a mixture with a carrier polymer, i.e. in so called master batch.

In a further embodiment, a polymer composition as described herein may comprise the polyethylene, as described herein, together with a crosslinking agent and together with 0, 1, 2, 3, 4, 5, 6 or more additive(s), and wherein the polymer composition is in the form of pellets.

Still a further embodiment of the polyethylene according to the present invention, as described herein, discloses the polyethylene containing a total amount of vinyl groups which is B vinyl groups per 1000 carbon atoms, and $B_1 \leq B$, wherein $B_1$ is 0.89, when measured prior to crosslinking according to method ASTM D6248-98.

Still a further embodiment of the polyethylene is disclosed, wherein $B_1$ is 0.90.

An even further embodiment of the polyethylene is disclosed, wherein $B_1$ is 0.94.

Still a further embodiment of the polyethylene is disclosed, wherein $B_1$ is 0.95.

An even further embodiment of the polyethylene is disclosed, wherein $B_1$ is 1.00.

Further embodiments of the polyethylene are disclosed, wherein $B_1$ is 0.95, 1.00, 1.05 or 1.10.

Still further embodiments of the polyethylene are disclosed, wherein $B_1$ is 0.95, 1.00, 1.05, 1.10, 1.15, 1.20, 1.25 or 1.30.

Even further embodiments of the polyethylene are disclosed, wherein $B_1$ is 1.15, 1.20, 1.25 or 1.30.

Still a further embodiment of the polyethylene is disclosed, wherein $B_1$ is 1.05.

An even further embodiment of the polyethylene is disclosed, wherein $B_1$ is 1.10.

Still a further embodiment of the polyethylene is disclosed, wherein $B_1$ is 1.15.

An even further embodiment of the polyethylene is disclosed, wherein $B_1$ is 1.20.

A further embodiment of the polyethylene is disclosed, wherein $B_1$ is 1.25.

Still a further embodiment of the polyethylene is disclosed, wherein $B_1$ is 1.30.

Still a further embodiment of the polyethylene according to the present invention, as described herein, is disclosed, wherein $B \leq B_2$ and $B_2$ is 3.0.

Further embodiments of the polyethylene are disclosed wherein the polyethylene contains a total amount of vinyl groups which is B vinyl groups per 1000 carbon atoms, and $B_1 \leq B \leq B_2$, wherein $B_1$ and $B_2$ may each be selected from any of the values given herein for $B_1$ and $B_2$, respectively.

A further embodiment of the polyethylene according to the present invention, as described herein, is disclosed, wherein $B_2$ is 2.5.

An even further embodiment of the polyethylene according to the present invention, as described herein, is disclosed, wherein $B_2$ is 2.0.

A further embodiment of the polyethylene according to the present invention, as described herein, is disclosed, wherein $B_2$ is 1.8.

An even further embodiment of the polyethylene according to the present invention, as described herein, is disclosed, wherein $B_2$ is 1.7.

A further embodiment of the polyethylene according to the present invention, as described herein, is disclosed, wherein $B_2$ is 1.6.

An even further embodiment of the polyethylene according to the present invention, as described herein, is disclosed, wherein $B_2$ is 1.5.

An embodiment of the present invention is provided wherein the polyethylene has a melt flow rate at 2.16 kg loading ($MFR_2$), which $MFR_2$ is A g/10 min and $A_1 \leq A \leq A_2$; wherein $A_1$ is 0.05 and $A_2$ is 1.70, when determined according to method ISO 1133-1:2011, see some details of method ISO 1133-1:2011 in Melt Flow Rate under Determination Methods herein.

The $MFR_2$ is determined, prior to any crosslinking, according to ISO 1133-1:2011 under 2.16 kg load and at 190° C.

In a further embodiment according to the present invention, the polyethylene, as described herein, has a melt flow rate at 2.16 kg loading ($MFR_2$) and at 190° C., determined, according to method ISO 1133-1:2011, which $MFR_2$ is A g/10 min and $A \leq A_2$, wherein $A_2$ is 10.

A further embodiment of the polyethylene according to the present invention, as described herein, is disclosed, wherein $A_2$ is 5.0.

In still a further embodiment of the polyethylene, $A_2$ is 4.0.

Still an embodiment of the polyethylene according to the present invention, as described herein, is disclosed, wherein $A_2$ is 3.0.

In still a further embodiment the polyethylene according to the present invention, as described herein, is disclosed, wherein $A_2$ is 2.7.

A further embodiment of the polyethylene according to the present invention, as described herein, is disclosed, wherein $A_2$ is 2.5.

Still an embodiment of the polyethylene according to the present invention, as described herein, is disclosed, wherein $A_2$ is 2.0.

A further embodiment of the polyethylene according to the present invention, as described herein, is disclosed, wherein $A_2$ is 1.7.

In still a further embodiment the polyethylene has a melt flow rate, $MFR_2$, which is A g/10 min and $A_1 \leq A$; wherein $A_1$ is 0.05.

Further embodiments of the polyethylene are disclosed which have a melt flow rate, $MFR_2$, which is A g/10 min and $A_1 \leq A \leq A_2$; wherein $A_1$ and $A_2$ may each be selected from any of the values given herein for $A_1$ and $A_2$, respectively.

Still an embodiment of the polyethylene according to the present invention, as described herein, is disclosed, wherein $A_1$ is 0.10.

A further embodiment of the polyethylene according to the present invention, as described herein, is disclosed, wherein $A_1$ is 0.15.

An embodiment of the polyethylene according to the present invention, as described herein, is disclosed, wherein $A_1$ is 0.20.

Still an embodiment of the polyethylene according to the present invention, as described herein, is disclosed, wherein $A_1$ is 0.25.

A further embodiment of the polyethylene according to the present invention, as described herein, is disclosed, wherein $A_1$ is 0.30.

An embodiment of the polyethylene according to the present invention, as described herein, is disclosed, wherein $A_1$ is 0.35.

Still an embodiment of the polyethylene according to the present invention, as described herein, is disclosed, wherein $A_1$ is 0.40.

A further embodiment of the polyethylene according to the present invention, as described herein, is disclosed, wherein $A_1$ is 0.45.

An embodiment of the polyethylene according to the present invention, as described herein, is disclosed, wherein $A_1$ is 0.50.

A further embodiment of the polyethylene according to the present invention, as described herein, is disclosed, wherein $A_1$ is 0.55.

An embodiment of the polyethylene according to the present invention, as described herein, is disclosed, wherein $A_1$ is 0.60.

Still an embodiment of the polyethylene according to the present invention, as described herein, is disclosed, wherein $A_1$ is 0.65.

A further embodiment of the polyethylene according to the present invention, as described herein, is disclosed, wherein $A_1$ is 0.70.

An embodiment of the polyethylene according to the present invention, as described herein, is disclosed, wherein $A_1$ is 0.75.

Still an embodiment of the polyethylene according to the present invention, as described herein, is disclosed, wherein $A_1$ is 0.80.

A further embodiment of the polyethylene according to the present invention, as described herein, is disclosed, wherein $A_1$ is 0.85.

An embodiment of the polyethylene according to the present invention, as described herein, is disclosed, wherein $A_1$ is 0.90.

An embodiment of the polyethylene according to the present invention, as described herein, is disclosed, wherein $A_2$ is 1.65, 1.60, 1.55 or 1.50.

A further embodiment of the polyethylene according to the present invention, as described herein, is disclosed, wherein $A_2$ is 1.65.

Still a further embodiment of the polyethylene according to the present invention, as described herein, is disclosed, wherein $A_2$ is 1.60.

A further embodiment of the polyethylene according to the present invention, as described herein, is disclosed, wherein $A_2$ is 1.65 or 1.60.

An embodiment of the polyethylene according to the present invention, as described herein, is disclosed, wherein $A_2$ is 1.55.

An even further embodiment of the polyethylene according to the present invention, as described herein, is disclosed, wherein $A_2$ is 1.50.

A further embodiment of the polyethylene according to the present invention, as described herein, is disclosed, wherein $A_2$ is 1.55 or 1.50.

Further embodiments of the polyethylene are disclosed wherein the polyethylene has a complex viscosity ($\eta^*$) at 0.05 rad/sec, determined according to method ISO 6721-1 on stabilised samples of the polyethylene, which is X Pas, and $X_1 \leq X \leq X_2$, wherein $X_1$ and $X_2$ may each be selected from any of the values given herein for $X_1$ and $X_2$, respectively.

Still further embodiments of the polyethylene are disclosed wherein the polyethylene has a complex viscosity ($\eta^*$) at 300 rad/sec determined according to method ISO 6721-1 on stabilised samples of the polyethylene, which is Y Pas, and $Y_1 \leq Y \leq Y_2$, wherein $Y_1$ and $Y_2$ may each be selected from any of the values given herein for $Y_1$ and $Y_2$, respectively.

An embodiment of the polyethylene according to the present invention, as described herein, is disclosed, wherein $X_1$ is 11000.

A further embodiment of the polyethylene according to the present invention, as described herein, is disclosed, wherein $X_1$ is 12000.

Still a further embodiment of the polyethylene according to the present invention, as described herein, is disclosed, wherein $X_1$ is 13000.

An embodiment of the polyethylene according to the present invention, as described herein, is disclosed, wherein $X_1$ is 14000.

A further embodiment of the polyethylene according to the present invention, as described herein, is disclosed, wherein $X_2$ is 29000.

An even further embodiment of the polyethylene according to the present invention, as described herein, is disclosed, wherein $X_2$ is 28000.

An embodiment of the polyethylene according to the present invention, as described herein, is disclosed, wherein $X_2$ is 27000.

A further embodiment of the polyethylene according to the present invention, as described herein, is disclosed, wherein $X_2$ is 26000.

Still a further embodiment of the polyethylene according to the present invention, as described herein, is disclosed, wherein $X_2$ is 25000.

An embodiment of the polyethylene according to the present invention, as described herein, is disclosed, wherein $X_2$ is 24000.

A further embodiment of the polyethylene according to the present invention, as described herein, is disclosed, wherein $X_1$ is 15000.

An even further embodiment of the polyethylene according to the present invention, as described herein, is disclosed, wherein $X_1$ is 16000.

A further embodiment of the polyethylene according to the present invention, as described herein, is disclosed, wherein $X_1$ is 17000.

An even further embodiment of the polyethylene according to the present invention, as described herein, is disclosed, wherein $X_1$ is 18000.

A further embodiment of the polyethylene according to the present invention, as described herein, is disclosed, wherein $X_1$ is 18100.

Still a further embodiment of the polyethylene according to the present invention, as described herein, is disclosed, wherein $X_1$ is 18200.

An embodiment of the polyethylene according to the present invention, as described herein, is disclosed, wherein $X_1$ is 18300.

A further embodiment of the polyethylene according to the present invention, as described herein, is disclosed, wherein $X_1$ is 18400.

An even further embodiment of the polyethylene according to the present invention, as described herein, is disclosed, wherein $X_1$ is 18500.

A further embodiment of the polyethylene according to the present invention, as described herein, is disclosed, wherein $X_1$ is 18600.

An even further embodiment of the polyethylene according to the present invention, as described herein, is disclosed, wherein $X_1$ is 18700.

A further embodiment of the polyethylene according to the present invention, as described herein, is disclosed, wherein $X_2$ is 23500.

An even further embodiment of the polyethylene according to the present invention, as described herein, is disclosed, wherein $X_2$ is 23000.

A further embodiment of the polyethylene according to the present invention, as described herein, is disclosed, wherein $X_2$ is 22900.

Still a further embodiment of the polyethylene according to the present invention, as described herein, is disclosed, wherein $X_2$ is 22800.

A further embodiment of the polyethylene according to the present invention, as described herein, is disclosed, wherein $X_2$ is 22700.

An embodiment of the polyethylene according to the present invention, as described herein, is disclosed, wherein $X_2$ is 22600.

A further embodiment of the polyethylene according to the present invention, as described herein, is disclosed, wherein $X_2$ is 22500.

A further embodiment of the polyethylene according to the present invention, as described herein, is disclosed, wherein $X_2$ is 22400.

An even further embodiment of the polyethylene according to the present invention, as described herein, is disclosed, wherein $X_2$ is 22300.

A further embodiment of the polyethylene according to the present invention, as described herein, is disclosed, wherein $X_2$ is 22000.

An embodiment of the polyethylene according to the present invention, as described herein, is disclosed, wherein $X_2$ is 21500.

A further embodiment of the polyethylene according to the present invention, as described herein, is disclosed, wherein $X_2$ is 21000.

A further embodiment of the polyethylene according to the present invention, as described herein, is disclosed, wherein $X_2$ is 20500.

An even further embodiment of the polyethylene according to the present invention, as described herein, is disclosed, wherein $X_2$ is 20000.

A further embodiment of the polyethylene according to the present invention, as described herein, is disclosed, wherein $X_2$ is 19500.

An even further embodiment of the polyethylene according to the present invention, as described herein, is disclosed, wherein $X_2$ is 19000.

A further embodiment of the polyethylene according to the present invention, as described herein, is disclosed, wherein $Y_1$ is 10.

An even further embodiment of the polyethylene according to the present invention, as described herein, is disclosed, wherein $Y_1$ is 20.

A further embodiment of the polyethylene according to the present invention, as described herein, is disclosed, wherein $Y_1$ is 30.

Still a further embodiment of the polyethylene according to the present invention, as described herein, is disclosed, wherein $Y_1$ is 40.

An embodiment of the polyethylene according to the present invention, as described herein, is disclosed, wherein $Y_1$ is 50.

A further embodiment of the polyethylene according to the present invention, as described herein, is disclosed, wherein $Y_1$ is 60.

An even further embodiment of the polyethylene according to the present invention, as described herein, is disclosed, wherein $Y_1$ is 70.

A further embodiment of the polyethylene according to the present invention, as described herein, is disclosed, wherein $Y_1$ is 80.

An even further embodiment of the polyethylene according to the present invention, as described herein, is disclosed, wherein $Y_1$ is 90.

A further embodiment of the polyethylene according to the present invention, as described herein, is disclosed, wherein $Y_1$ is 100.

An even further embodiment of the polyethylene according to the present invention, as described herein, is disclosed, wherein $Y_1$ is 110.

An embodiment of the polyethylene according to the present invention, as described herein, is disclosed, wherein $Y_1$ is 120.

A further embodiment of the polyethylene according to the present invention, as described herein, is disclosed, wherein $Y_1$ is 130.

Still a further embodiment of the polyethylene according to the present invention, as described herein, is disclosed, wherein $Y_1$ is 140.

An embodiment of the polyethylene according to the present invention, as described herein, is disclosed, wherein $Y_1$ is 150.

A further embodiment of the polyethylene according to the present invention, as described herein, is disclosed, wherein $X_1$ is 15000 and/or $Y_1$ is 150.

A further embodiment of the polyethylene according to the present invention, as described herein, is disclosed, wherein $Y_1$ is 160.

An even further embodiment of the polyethylene according to the present invention, as described herein, is disclosed, wherein $Y_1$ is 170.

A further embodiment of the polyethylene according to the present invention, as described herein, is disclosed, wherein $Y_1$ is 180.

An even further embodiment of the polyethylene according to the present invention, as described herein, is disclosed, wherein $Y_1$ is 190.

An embodiment of the polyethylene according to the present invention, as described herein, is disclosed, wherein $Y_1$ is 200.

A further embodiment of the polyethylene according to the present invention, as described herein, is disclosed, wherein $Y_1$ is 210.

Still a further embodiment of the polyethylene according to the present invention, as described herein, is disclosed, wherein $Y_1$ is 220.

An embodiment of the polyethylene according to the present invention, as described herein, is disclosed, wherein $Y_1$ is 230.

A further embodiment of the polyethylene according to the present invention, as described herein, is disclosed, wherein $Y_1$ is 240.

An even further embodiment of the polyethylene according to the present invention, as described herein, is disclosed, wherein $Y_1$ is 250.

An embodiment of the polyethylene according to the present invention, as described herein, is disclosed, wherein $Y_2$ is 345.

Still an embodiment of the polyethylene according to the present invention, as described herein, is disclosed, wherein $Y_1$ is 50 and/or $Y_2$ is 345.

A further embodiment of the polyethylene according to the present invention, as described herein, is disclosed, wherein $Y_2$ is 340.

Still a further embodiment of the polyethylene according to the present invention, as described herein, is disclosed, wherein $Y_2$ is 335.

An embodiment of the polyethylene according to the present invention, as described herein, is disclosed, wherein $Y_2$ is 330.

A further embodiment of the polyethylene according to the present invention, as described herein, is disclosed, wherein $Y_2$ is 325.

Still a further embodiment of the polyethylene according to the present invention, as described herein, is disclosed, wherein $Y_2$ is 320.

An embodiment of the polyethylene according to the present invention, as described herein, is disclosed, wherein $Y_2$ is 315.

A further embodiment of the polyethylene according to the present invention, as described herein, is disclosed, wherein $Y_2$ is 310.

Still a further embodiment of the polyethylene according to the present invention, as described herein, is disclosed, wherein $Y_2$ is 305.

An embodiment of the polyethylene according to the present invention, as described herein, is disclosed, wherein $Y_2$ is 300.

Still a further embodiment of the polyethylene according to the present invention, as described herein, is disclosed, wherein $X_1$ is 12000 and $X_2$ is 28000.

A further embodiment of the polyethylene according to the present invention, as described herein, is disclosed, wherein $X_1$ is 12000 and $X_2$ is 28000, and wherein $Y_1$ is 250 and $Y_2$ is 330.

Still a further embodiment of the polyethylene according to the present invention, as described herein, is disclosed, wherein $X_1$ is 13000 and $X_2$ is 27000, and wherein $Y_1$ is 240 and $Y_2$ is 340.

An even further embodiment of the polyethylene according to the present invention, as described herein, is disclosed, wherein $X_1$ is 13000 and $X_2$ is 27000, and wherein $Y_1$ is 250 and $Y_2$ is 330.

An even further embodiment of the polyethylene according to the present invention, as described herein, is disclosed, wherein $X_1$ is 16000. $X_2$ is 24000, $Y_1$ is 250 and/or $Y_2$ is 330.

In one preferred embodiment the polyethylene simultaneously satisfies the following:

$B_1 \leq B \leq B_2$ wherein $B_1$ is 0.30 and $B_2$ is 1.5;
$X_1 \leq X \leq X_2$ wherein $X_1$ is 16000 and $X_2$ is 24000; and
$Y_1 \leq Y \leq Y_2$ wherein $Y_1$ is 250 and $Y_2$ is 330.

A Polymer Composition Obtained from, or Comprising, the Polyethylene

A polymer composition, obtained from the polyethylene, which may be crosslinkable, is highly suitable for producing crosslinkable articles, e.g. one or more crosslinkable layers of a cable, for example one or more crosslinkable insulation layers, of a cable, which layers are subsequently crosslinked.

A further embodiment according to the present invention, as described herein, is disclosed, wherein a polymer composition is disclosed, which is crosslinkable or crosslinked, wherein the polymer composition comprises, or is obtained from, the polyethylene as described herein.

"Crosslinkable" is a well known expression and means that the polymer composition, obtained from the polyethylene, can be crosslinked, e.g. via radical formation, to form bridges i.a. amongst the polymer chains.

The term "cable" means herein cable or wire.

The polymer composition obtained from, the polyethylene, or comprising the polyethylene, further comprises a crosslinking agent.

Said polymer composition may optionally comprise further component(s) containing vinyl groups, which then also contribute to the amount of vinyl groups in the polymer composition.

The crosslinking agent is defined herein to be any compound capable to generate radicals which can initiate a crosslinking reaction. For example, the crosslinking agent contains —O—O— bond.

A further embodiment of said polymer composition, as described herein, is disclosed, wherein the crosslinking agent comprises peroxide, i.e. comprises at least one peroxide unit per molecule of crosslinking agent, e.g. a peroxide.

In an even further embodiment, the crosslinking agent comprises a peroxide.

In a further embodiment, the crosslinking agent is a peroxide.

Furthermore, embodiments of said polymer composition, as described herein, are disclosed, wherein the crosslinking agent, for example peroxide, is present in an amount which is Z wt %, based on the total amount (100 wt %) of the polymer composition, $Z \leq Z_2$, wherein $Z_2$ is 10, $Z_2$ is 6, $Z_2$ is 5 or $Z_2$ is 3.5.

In a further embodiment $Z_1 \leq Z$, wherein $Z_1$ is 0.01.

In further embodiments of the present invention, said polymer composition, as described herein, is disclosed, wherein $Z_1$ is 0.02, 0.04, 0.06 or 0.08.

Even further, embodiments of said polymer composition according to the present invention, as described herein, are disclosed, wherein $Z_1$ is, for example, 0.1 or 0.2 and/or $Z_2$ is, for example, 3, or 2.6.

In further embodiments of the present invention, said polymer composition, as described herein, is disclosed, wherein $Z_2$ is 2.0, 1.8, 1.6 or, alternatively, 1.4.

In still an embodiment the crosslinking agent, for example peroxide, is $Z_2$ being 1.2.

In still a further embodiments of the present invention, said polymer composition, as described herein, is disclosed, wherein $Z_2$ is 1.2, 1.1, 1.0 or, alternatively, 0.95.

In still a further embodiment, $Z_2$ is 1.0.

In a further embodiment $Z_2$ is 0.98 or 0.96. In still a further embodiment $Z_2$ is 0.98. In an even further embodiment $Z_2$ is 0.96. In a further embodiment $Z_2$ is 0.94, 0.92 or 0.90. In still a further embodiment $Z_2$ is 0.94. In an even further embodiment $Z_2$ is 0.92. In a further embodiment $Z_2$ is 0.90.

In a further embodiment $Z_2$ is 0.88 or 0.86. In still a further embodiment $Z_2$ is 0.88. In an even further embodiment $Z_2$ is 0.86. In a further embodiment $Z_2$ is 0.84, 0.82 or 0.80. In still a further embodiment $Z_2$ is 0.84. In an even further embodiment $Z_2$ is 0.82. In a further embodiment $Z_2$ is 0.80.

In a further embodiment $Z_2$ is 0.78 or 0.76. In still a further embodiment $Z_2$ is 0.78. In an even further embodiment $Z_2$ is 0.76. In a further embodiment $Z_2$ is 0.74, 0.72 or 0.70. In still a further embodiment $Z_2$ is 0.74. In an even further embodiment $Z_2$ is 0.72. In a further embodiment $Z_2$ is 0.70.

In an even further embodiment $Z_2$ is 0.68 or 0.66. In still a further embodiment $Z_2$ is 0.68. In an even further embodiment $Z_2$ is 0.66. In a further embodiment $Z_2$ is 0.64, 0.62 or 0.60. In still a further embodiment $Z_2$ is 0.64. In an even further embodiment $Z_2$ is 0.62.

The crosslinking agent, for example a peroxide, is present in an amount which is Z wt %, based on the total amount (100 wt %) of said polymer composition, and $Z \leq Z_2$, wherein $Z_2$ is 0.60.

In a further embodiment $Z_2$ is 0.58 or 0.56. In still a further embodiment $Z_2$ is 0.58. In an even further embodiment $Z_2$ is 0.56. In a further embodiment $Z_2$ is 0.54, 0.52 or 0.50. In still a further embodiment $Z_2$ is 0.54. In an even further embodiment $Z_2$ is 0.52. In a further embodiment $Z_2$ is 0.50.

In a further embodiment $Z_2$ is 0.48 or 0.46. In still a further embodiment $Z_2$ is 0.48. In an even further embodiment $Z_2$ is 0.46.

A further embodiment of said polymer composition according to the present invention, as described herein, is disclosed, the amount Z of the crosslinking agent, for example a peroxide, is $Z_2$ being 0.45.

In still a further embodiment the amount Z of the crosslinking agent, for example a peroxide, is $Z_2$ being 0.40.

In an even further embodiment, the amount Z of the crosslinking agent, for example a peroxide, is $Z_2$ being 0.35.

Non-limiting examples of the crosslinking agents comprise organic peroxides, such as di-tert-amylperoxide, 2,5-dimethyl-2,5-di(tert-butylperoxy)hexyne-3,2,5-di(tert-butylperoxy)-2,5-dimethylhexane, tert-butylcumylperoxide, di(tert-butyl)peroxide, dicumylperoxide, butyl-4,4-bis(tert-butylperoxy)-valerate, 1,1-bis(tert-butylperoxy)-3,3,5-trimethylcyclohexane, tert-butylperoxybenzoate, dibenzoylperoxide, bis(tert butylperoxyisopropyl)benzene, 2,5-dimethyl-2,5-di(benzoylperoxy)hexane, 1,1-di(tert-butylperoxy)cyclohexane, 1,1-di(tert amylperoxy)cyclohexane, or any mixtures thereof.

In further embodiments, the crosslinking agent being a peroxide may, for example, be selected from 2,5-dimethyl-2,5-di(tert-butylperoxy)hexyne-3,2,5-di(tert-butylperoxy)-2,5-dimethylhexane, di(tert-butylperoxyisopropyl)benzene, dicumylperoxide, tert-butylcumylperoxide, di(tert-butyl) peroxide, or any mixtures thereof.

In still a further embodiment the crosslinking agent is a peroxide selected from any of dicumylperoxide, 2,5-dimethyl-2,5-di(tert-butylperoxy)hexyne-3 and tert-butylcumylperoxide, or of any mixtures thereof.

In a further embodiment, the crosslinking agent comprises a peroxide which is dicumylperoxide.

In still a further embodiment, the crosslinking agent comprises a peroxide which is 2,5-dimethyl-2,5-di(tert-butylperoxy)hexyne-3.

In even a further embodiment, the crosslinking agent comprises a peroxide which is tert-butylcumylperoxide.

In an embodiment said polymer composition comprises the crosslinking agent.

In further embodiments said polymer composition may also comprise further additive(s). Such further additive(s) comprise:
unsaturated low molecular weight compound(s), for example:
  Crosslinking booster(s) mentioned herein, including any given specific compound(s), which can contribute to the crosslinking degree and/or to the amount of vinyl groups in the polymer composition.
  One or more scorch retarders (SR) which are defined herein to be compounds that reduce the formation of scorch during extrusion of a polymer composition, at typical extrusion temperatures used, if compared to the same polymer composition extruded without said compound. The scorch retarders can also contribute to the amount of vinyl groups in the polymer composition.

The unsaturated low molecular weight compound(s), for example, the crosslinking booster(s) and/or the "one or more" scorch retarders (SR) may also contribute to the amount of vinyl groups in the polymer composition.

The crosslinking booster may be a compound containing at least 2, unsaturated groups, such as an aliphatic or aromatic compound, an ester, an ether, an amine, or a ketone, which contains at least 2, unsaturated group(s), such as a cyanurate, an isocyanurate, a phosphate, an ortho formate, an aliphatic or aromatic ether, or an allyl ester of benzene tricarboxylic acid. Examples of esters, ethers, amines and ketones are compounds selected from general groups of diacrylates, triacrylates, tetraacrylates, triallylcyanurate, triallylisocyanurate, 3,9-divinyl-2,4,8,10-tetra-oxaspiro[5,5]-undecane (DVS), triallyl trimellitate (TATM) or N,N,N',N',N'',N''-hexaallyl-1,3,5-triazine-2,4,6-triamine (HATATA), or any mixtures thereof. The crosslinking booster can be added in an amount of such crosslinking less than 2.0 wt %, for example, less than 1.5 wt %, e.g. less than 1.0 wt %, for example, less than 0.75 wt %, e.g less than 0.5 wt %, and the lower limit thereof is, for example, at least 0.05 wt %, e.g., at least 0.1 wt %, based on the weight of the polymer composition.

The scorch retarders (SR) may, e.g., be unsaturated dimers of aromatic alpha-methyl alkenyl monomers, such as 2,4-di-phenyl-4-methyl-1-pentene, substituted or unsubstituted diphenylethylene, quinone derivatives, hydroquinone derivatives, monofunctional vinyl containing esters and ethers, monocyclic hydrocarbons having at least two or more double bonds, or mixtures thereof. For example, the scorch retarder may be selected from 2,4-diphenyl-4-methyl-1-pentene, substituted or unsubstituted diphenylethylene, or mixtures thereof.

The amount of scorch retarder may, for example, be equal to, or more than, 0.005 wt %, based on the weight of the polymer composition. Further, the amount of scorch retarder may, for example, be equal to, or more than, 0.01 wt %, equal to, or more than, 0.03 wt %, or equal to, or more than, 0.04 wt %, based on the weight of the polymer composition.

Further, the amount of scorch retarder may, for example, be equal to, or less than, 2.0 wt %, e.g., equal to, or less than, 1.5 wt %, based on the weight of the polymer composition. Further, the amount of scorch retarder may, for example, be equal to, or less than, 0.8 wt %, equal to, or less than, 0.75 wt %, equal to, or less than, 0.70 wt %, or equal to, or less than, 0.60 wt %, based on the weight of the polymer composition. Moreover, the amount of scorch retarder may, for example, be equal to, or less than, 0.55 wt %, equal to, or less than, 0.50 wt %, equal to, or less than, 0.45 wt %, or equal to, or less than, 0.40 wt %, based on the weight of the polymer composition.

Still further, the amount of scorch retarder may, for example, be equal to, or less than, 0.35 wt %, e.g., equal to, or less than, 0.30 wt %, based on the weight of the polymer composition. Further, the amount of scorch retarder may, for example, be equal to, or less than, 0.25 wt %, equal to, or less than, 0.20 wt %, equal to, or less than, 0.15 wt %, or equal to, or less than, 0.10 wt %, based on the weight of the polymer composition. Moreover, the amount of scorch retarder may, for example, be equal to, or less than, 0.15 wt %, or equal to, or less than, 0.10 wt %, based on the weight of the polymer composition.

Furthermore, the amount of scorch retarder may, for example, be within the range of 0.005 to 2.0 wt %, e.g., within the range of 0.005 to 1.5 wt %, based on the weight of the polymer composition. Further exemplified ranges are e.g. from 0.01 to 0.8 wt %, 0.03 to 0.75 wt %, 0.03 to 0.70 wt %, or 0.04 to 0.60 wt %, based on the weight of the polymer composition. Moreover, exemplified ranges are e.g. from 0.01 to 0.60, to 0.55, to 0.50, to 0.45 or, alternatively, to 0.40 wt %, 0.03 to 0. 0.55 or, alternatively, to 0.50 wt %, 0.03 to 0.45 or, alternatively, 0.40 wt %, or 0.04 to 0.45 or, alternatively, 0.40 wt %, based on the weight of the polymer composition.

Further, the scorch retarders (SR) may, e.g., be selected from graftable stable organic free radicals, as described in EP1699882, which include hindered amine-derived stable organic free radicals: for example, hydroxy-derivative of 2,2,6,6,-tetramethyl piperidinyl oxy (TEMPO), e.g. 4-hydroxy-TEMPO or a bis-TEMPO (for example, bis(1-oxyl-2,2,6,6-tetramethylpiperidine-4-yl)sebacate), and, for example, multi-functional molecules having at least two nitroxyl groups derived from oxo-TEMPO, 4-hydroxy-TEMPO, an ester of 4-hydroxy-TEMPO, polymer-bound TEMPO, PROXYL, DOXYL, ditertiary butyl N oxyl, dimethyl diphenylpyrrolidine-1-oxyl, or 4 phosphonoxy TEMPO.

The graftable stable organic free radicals may be, as described in EP1699882, present in an amount equal to, or more than, about 0.005 weight percent, for example, equal to, or more than, about 0.01 weight percent and equal to, or more than, about 0.03 weight percent, based on the weight of the polymer composition.

Further, the graftable stable organic free radicals may be, as described in EP1699882, present in an amount equal to, or less than, about 20.0 weight percent, for example, equal to, or less than, about 10.0 weight percent, e.g., equal to, or less than, about 5.0 weight percent, based on the weight of the polymer composition.

Furthermore, the graftable stable organic free radicals may be, as described in EP1699882, present in an amount between about 0.005 weight percent and about 20.0 weight percent, for example, between 15 about 0.01 weight percent and about 10.0 weight percent, e.g., between about 0.03 weight percent and about 5.0 weight percent, based on the weight of the polymer composition.

Moreover, such further additive(s) comprise additive(s), such as antioxidant(s), stabiliser(s), and/or processing aid(s). As an antioxidant, sterically hindered or semi-hindered phenol(s), aromatic amine(s), aliphatic sterically hindered amine(s), organic phosphate(s), thio compound(s), and mixtures thereof, can be mentioned. As further additive(s), flame retardant additive(s), water tree retardant additive(s), acid scavenger(s), filler(s) pigment(s), and voltage stabilizer(s) can be mentioned.

Examples of suitable fillers and/or pigments include $TiO_2$, $CaCO_3$, carbon black (e.g. conductive carbon black or "UV black", i.e. a carbon black that absorbs ultraviolet radiation), huntite, mica, kaolin, aluminium hydroxide (ATH), magnesium dihydroxide (MDH), and $SiO_2$.

In still a further embodiment said polymer composition according to the present invention further comprises fillers and/or pigments.

Furthermore, said fillers and/or pigments may be comprised in said polymer composition according to the present invention in amounts of, for example, 0.01 to 5 wt %, e.g., 0.01 to 3 wt % or, e.g., 0.01 to 2 wt %.

Said polymer composition may additionally comprise further polymer component(s) including unsaturated polymer(s) and/or polymer(s) that are not unsaturated, wherein the further polymer component(s) are different from said polyethylene.

Said polymer composition can be provided in the form of a powder or pellets in any shape and size including granules. Pellets can be produced, e.g. after polymerisation of said polyethylene, in a well known manner using the conventional pelletising equipment, such as a pelletising extruder. The polymer composition may, for example, be provided in the form of pellets.

A further embodiment of the present invention discloses a process for producing a polymer composition as described herein.

Still a further embodiment of the present invention discloses a process for producing a polyethylene as described herein, or a process for producing a polymer composition as described herein.

End Applications

An embodiment of the present invention provides an article obtained from process comprising use of a polyethylene as described herein, or of a polymer composition as described herein, wherein the article is, for example, a cable, e.g. a power cable, for example, a cable layer, or e.g. a power cable layer.

A further embodiment of the present invention provides an article comprising layer(s) which is/are obtained from the polyethylene as described herein.

Still a further embodiment of the present invention provides an article comprising layer(s), e.g. insulating layer(s), which is/are obtained from the polyethylene as described herein, wherein the article is, for example, a cable, e.g. a power cable.

A further embodiment of the present invention provides an article comprising element(s) which element/s comprising layer(s), e.g. insulating layer(s), which is/are obtained from the polyethylene, as described herein, or from the polymer composition, as described herein.

In a further embodiment of the present invention an article is provided, wherein said article, or the element(s), comprising layer(s), e.g. insulating layer(s), which is/are cross-linkable and is/are obtained from the polyethylene, as described herein, or from the polymer composition, as described herein.

In still a further embodiment of the present invention an article is provided, wherein said article, or the element(s), comprise(s) the polyethylene as described herein, or the polymer composition, as described herein.

In a further embodiment of the present invention an article is provided, wherein said article, or the element(s), comprising layer(s), e.g. insulating layer(s), which is/are cross-linked and is/are obtained from the polyethylene as described herein, or from the polymer composition, as described herein.

In still a further embodiment of the present invention an article is provided, wherein said article, or the element(s), comprise(s) the polymer composition as described herein.

In a further embodiment of the present invention an article is provided, wherein said article, or the element(s), comprising layer(s), e.g. insulating layer(s), which is/are cross-linked and is/are obtained from the polymer composition as described herein.

A further embodiment of the present invention provides an article, which is a cable, e.g. a power cable.

Further, the invention is highly suitable for W&C applications, whereby an article is e.g. a cable, which is cross-linkable and comprises one or more layers, wherein at least one layer is obtained from the polyethylene, or the polymer composition, as described herein.

Furthermore, still a further embodiment of the present invention is provided, wherein said at least one layer comprises the polyethylene, or the polymer composition, as described herein.

A further embodiment of the present invention provides a power cable, comprising layer(s), e.g. insulating layer(s), which is/are obtained from the polyethylene, or the polymer composition, as described herein.

Still a further embodiment of the present invention is provided, wherein said article is an AC power cable.

A further embodiment of the present invention is provided wherein said article is a DC power cable.

Further, the at least one layer of the cable obtained from the polyethylene, or the polymer composition, is e.g., an insulation layer.

Furthermore, the at least one layer of the cable comprising the polyethylene, or the polymer composition, may, e.g., be an insulation layer.

Further, the cable of the present invention may, for example, be a power cable which comprises at least an inner semiconducting layer, an insulation layer and an outer semiconducting layer in given order, wherein at least the insulation layer is obtained from the polyethylene, or the polymer composition, as described herein.

In a further embodiment the insulation layer comprises the polyethylene, or the polymer composition, as described herein.

The power cable means herein a cable that transfers energy operating at any voltage. The voltage applied to the power cable can be AC, DC or transient (impulse). In an embodiment, the multi-layered article is a power cable operating at voltages higher than 6 kV.

A further embodiment of the present invention discloses a process for producing an article, as described herein, which process comprises use of the polyethylene, or the polymer composition, as described herein.

Moreover, the invention provides a process for producing the herein described article, which comprises the steps of a) forming an article, wherein the process comprises the polyethylene, or the polymer composition, as described herein. Said process may, for example, comprise at least the steps of a$_0$) meltmixing a polymer composition as described herein optionally together with further component(s), and a) forming a cable obtained from the polymer composition as described herein.

A further embodiment discloses forming a cable comprising the polymer composition as described herein.

"Meltmixing" is well known blending method, wherein the polymer component(s) are mixed in an elevated temperature, which is typically above, e.g. at least 20-25° C. above, the melting or softening point of polymer component(s).

In an embodiment a cable, which comprises a conductor surrounded by one or more layers, is produced, wherein the process comprises a step of a) applying on a conductor the polymer composition, as described herein, to form at least one of said layers surrounding the conductor.

Thus in step (a) the at least one layer of said one or more layers is applied and obtained by using the polymer composition as described herein.

Also the herein exemplified cable production process may, for example, comprise at least two steps of a$_0$) meltmixing said polymer composition, as described herein, optionally together with further component(s), and then a) applying the meltmix obtained from step a$_0$) on a conductor to form at least one layer.

The polymer composition, as described herein, may be introduced to step a$_0$) of the process, e.g. in pellet form and mixing, i.e. meltmixing, is carried out in an elevated temperature which melts (or softens) the polymer material to enable processing thereof.

Further, the layers may, for example, be a) applied by (co)extrusion. The term "(co)extrusion" means herein that in case of two or more layers, said layers can be extruded in separate steps, or at least two or all of said layers can be coextruded in a same extrusion step, as well known in the art.

In one exemplified embodiment the crosslinkable polymer composition may comprise a crosslinking agent before the polymer composition is used for cable production, whereby the polyethylene and the crosslinking agent can be blended by any conventional mixing process, e.g. by addition of the crosslinking agent to a melt of a composition of polymer, e.g. in an extruder, as well as by adsorption of liquid peroxide, peroxide in liquid form or peroxide dissolved in a solvent on a solid composition of polymer, e.g. pellets thereof. Alternatively in this embodiment, the polyethylene and the crosslinking agent can be blended by any conventional mixing process. Exemplary mixing procedures include melt mixing, e.g. in an extruder, as well as adsorption of liquid peroxide, peroxide in liquid form or a peroxide dissolved in a solvent of a composition of the polymer or on pellets thereof. The obtained polymer composition of components, for example, a.o. the polyethylene and the crosslinking agent, is then used for an article, e.g. a cable, preparation process.

In another embodiment, the crosslinking agent may be added e.g. in step a$_0$) during the preparation of the crosslinkable article, and also forms said polymer composition of the present invention. When the crosslinking agent is added during the article preparation process, then, for example, the crosslinking agent, as described herein, is added in a liquid form at ambient temperature, or is preheated above the melting point thereof or dissolved in a carrier medium, as well known in the art.

Said polymer composition of the present invention may also comprise further additive(s), or further additive(s) may be blended to the polymer composition during a preparation process of an article comprising the polymer composition.

Accordingly the process of the invention may, for example, comprise the steps of a$_{00}$) providing to said step a$_0$) said polymer composition as described herein, which comprises at least one polyethylene, and a crosslinking agent, a$_0$) meltmixing the polymer composition optionally together with further components, and a) applying the meltmix obtained from step a$_0$) on a conductor to form at least one of said one or more cable layers.

Alternatively, the process of the invention comprises the steps of a$_{00}$) providing to said step a$_0$) said polymer composition as described herein, which comprises at least one polyethylene, a$_{00'}$) adding to said polymer composition at least one crosslinking agent, a$_0$) meltmixing the polymer composition and the crosslinking agent, optionally together with further components, and a) applying the meltmix obtained from step a$_0$) on a conductor to form at least one of said one or more cable layers.

In the exemplified process, the a$_0$) meltmixing of the polymer composition alone is performed in a mixer or an extruder, or in any combination thereof, at elevated temperature and, if crosslinking agent is present, then also below the subsequently used crosslinking temperature. After a$_0$) meltmixing, e.g. in said extruder, the resulting meltmixed layer material is then, for example, a) (co)extruded on a conductor in a manner very well known in the field. Mixers and extruders, such as single or twins screw extruders, which are used conventionally for cable preparation are suitable for the process of the invention.

The exemplified embodiment of the process provides the preparation of a crosslinkable cable, e.g. a crosslinkable power cable, wherein the process comprises a further step of b) crosslinking the at least one cable layer obtained from step a) comprising the crosslinkable polyethylene of the polymer composition, wherein the crosslinking is performed in the presence of a crosslinking agent, e.g. a peroxide.

It is understood and well known that also the other cable layers and materials thereof, if present, can be crosslinked at the same time, if desired.

Crosslinking can be performed at crosslinking conditions, typically by treatment at increased temperature, e.g. at a temperature above 140° C., e.g. above 150° C., such as within the range of 160 to 350° C., depending on the used crosslinking agent as well known in the field. Typically the crosslinking temperature is at least 20° C. higher than the temperature used in meltmixing step a$_0$) and can be estimated by a skilled person.

As a result a crosslinked cable is obtained comprising at least one crosslinked layer of the polyethylene, or the polymer composition, of the invention.

In a further embodiment according to the present invention said polymer composition is disclosed, wherein the amount of vinyl groups originates from (beside vinyl groups originating from free radical initiated polymerisation):
i) polyunsaturated comonomer(s),
ii) chain transfer agent(s),
iii) unsaturated low molecular weight compound(s), e.g. crosslinking booster(s) and/or scorch retarder(s), or
iv) any mixture of (i) to (iii).

In general, "vinyl group" means herein $CH_2=CH-$ moiety which can be present in any of i) to iv).

The i) polyunsaturated comonomers and ii) chain transfer agents are described herein in relation to the polyethylene of the present invention.

The iii) low molecular weight compound(s), if present, may be added into the polymer composition.

Further, the iii) low molecular weight compound(s) can, for example, be crosslinking booster(s) which may also contribute to the amount of vinyl groups of the polymer composition. The crosslinking booster(s) may be e.g. compound(s) containing at least 2, unsaturated groups, such as an aliphatic or aromatic compound, an ester, an ether, or a ketone, which contains at least 2, unsaturated group(s), such as a cyanurate, an isocyanurate, a phosphate, an ortho formate, an aliphatic or aromatic ether, or an allyl ester of benzene tricarboxylic acid. Examples of esters, ethers, amines and ketones are compounds selected from general groups of diacrylates, triacrylates, tetraacrylates, triallylcyanurate, triallylisocyanurate, 3,9-divinyl-2,4,8,10-tetra-oxaspiro[5,5]-undecane (DVS), triallyl trimellitate (TATM) or N,N,N',N',N",N"-hexaallyl-1,3,5-triazine-2,4,6-triamine (HATATA), or any mixtures thereof. The crosslinking booster can be added in an amount of such crosslinking less than 2.0 wt %, for example, less than 1.5 wt %, e.g. less than 1.0 wt %, for example, less than 0.75 wt %, e.g. less than 0.5 wt %, and the lower limit thereof is, for example, at least 0.05 wt %, e.g., at least 0.1 wt %, based on the weight of the polymer composition.

Furthermore, the iii) low molecular weight compound(s) can, for example, be scorch retarder(s) (SR) which may also contribute to the amount of vinyl groups of the polymer composition.

The scorch retarders (SR) may, e.g., be, as already described herein, unsaturated dimers of aromatic alpha-methyl alkenyl monomers, such as 2,4-di-phenyl-4-methyl-1-pentene, substituted or unsubstituted diphenylethylene, quinone derivatives, hydroquinone derivatives, monofunctional vinyl containing esters and ethers, monocyclic hydrocarbons having at least two or more double bonds, or mixtures thereof. For example, the scorch retarder may be selected from 2,4-diphenyl-4-methyl-1-pentene, substituted or unsubstituted diphenylethylene, or mixtures thereof.

The amount of scorch retarder may, for example, be equal to, or more than, 0.005 wt %, based on the weight of the polymer composition. Further, the amount of scorch retarder may, for example, be equal to, or more than, 0.01 wt %, equal to, or more than, 0.03 wt %, or equal to, or more than, 0.04 wt %, based on the weight of the polymer composition.

Further, the amount of scorch retarder may, for example, be equal to, or less than, 2.0 wt %, e.g., equal to, or less than, 1.5 wt %, based on the weight of the polymer composition. Further, the amount of scorch retarder may, for example, be equal to, or less than, 0.8 wt %, equal to, or less than, 0.75 wt %, equal to, or less than, 0.70 wt %, or equal to, or less than, 0.60 wt %, based on the weight of the polymer composition. Moreover, the amount of scorch retarder may, for example, be equal to, or less than, 0.55 wt %, equal to, or less than, 0.50 wt %, equal to, or less than, 0.45 wt %, or equal to, or less than, 0.40 wt %, based on the weight of the polymer composition.

Still further, the amount of scorch retarder may, for example, be equal to, or less than, 0.35 wt %, e.g., equal to, or less than, 0.30 wt %, based on the weight of the polymer composition. Further, the amount of scorch retarder may, for example, be equal to, or less than, 0.25 wt %, equal to, or less than, 0.20 wt %, equal to, or less than, 0.15 wt %, or equal to, or less than, 0.10 wt %, based on the weight of the polymer composition. Moreover, the amount of scorch retarder may, for example, be equal to, or less than, 0.15 wt %, or equal to, or less than, 0.10 wt %, based on the weight of the polymer composition.

Furthermore, the amount of scorch retarder may, for example, be within the range of 0.005 to 2.0 wt %, e.g., within the range of 0.005 to 1.5 wt %, based on the weight of the polymer composition. Further exemplified ranges are e.g. from 0.01 to 0.8 wt %, 0.03 to 0.75 wt %, 0.03 to 0.70 wt %, or 0.04 to 0.60 wt %, based on the weight of the polymer composition. Moreover, exemplified ranges are e.g. from 0.01 to 0.60, to 0.55, to 0.50, to 0.45 or, alternatively, to 0.40 wt %, 0.03 to 0. 0.55 or, alternatively, to 0.50 wt %, 0.03 to 0.45 or, alternatively, 0.40 wt %, or 0.04 to 0.45 or, alternatively, 0.40 wt %, based on the weight of the polymer composition.

Further, the scorch retarders (SR) may, e.g., also be selected from graftable stable organic free radicals, as described in EP1699882 and as also already described herein.

The polyethylene may, for example, be a copolymer of monomer units with units of at least one unsaturated comonomer(s) and zero, one, two or three other comonomer(s), and comprises at least vinyl groups which originate from the polyunsaturated comonomer.

Further, the polyethylene may comprise about 0.05 to about 0.10 vinyl groups per 1000 carbon atoms (C-atoms) which originate from the free radical initiated polymerisation.

In accordance with the present invention each feature in any of the herein disclosed embodiments, in any category of the present invention, may freely be combined with any feature in any of the other herein disclosed embodiments.

Determination Methods

Unless otherwise stated in the description or experimental part the following methods were used for the property determinations.

Melt Flow Rate

The melt flow rate (MFR) is determined according to method ISO 1133-1:2011 and is indicated in g/10 min. The MFR is an indication of the flowability, and hence the processability, of the polymer, here the polyethylene, or of the polymer composition. The higher the melt flow rate, the lower the viscosity of the polymer, or of the polymer composition. The MFR is determined at 190° C. for polyethylenes and may be determined at different loadings such as 2.16 kg ($MFR_2$) or 21.6 kg ($MFR_{21}$).

Density

Density is measured on the polymer, i.e. on the polyethylene, according to ISO 1183-1 method A:2012. Sample preparation is done by compression moulding in accordance with ISO 17855-2:2016.

Methods ASTM D3124-98, and ASTM D6248-98, to Determine Amount of Double Bonds in the Polymer Composition or in the Polymer, i.e. the Polyethylene The method ASTM D6248-98 apply for determination of double bonds, both, in the polymer composition and in the polyethylene. Determination of double bonds of the polymer composition is made either on the polyethylene or, alternatively, on the polymer composition. The polymer composition and the polyethylene are, hereinafter in this method description, referred to as "the composition" and "the polymer", respectively.

The methods ASTM D3124-98, and ASTM D6248-98, include on one hand a procedure for the determination of the amount of double bonds/1000 C-atoms which is based upon the ASTM D3124-98 method. In the ASTM D3124-98 method, a detailed description for the determination of vinylidene groups/1000 C-atoms is given based on 2,3-dimethyl-1,3-butadiene. In the ASTM D6248-98 method, detailed descriptions for the determination of vinyl and trans-vinylene groups/1000 C-atoms are given based on 1-octene and trans-3-hexene, respectively. The described sample preparation procedure therein has here been applied for the determination of vinyl groups/1000 C-atoms and trans-vinylene groups/1000 C-atoms in the present invention. The ASTM D6248-98 method suggests possible inclusion of the bromination procedure of the ASTM D3124-98 method but the samples with regard to the present invention were not brominated. We have demonstrated that the determination of vinyl groups/1000 C-atoms and trans-vinylene groups/1000 C-atoms can be done without any significant interferences even without subtraction of spectra from brominated samples. For the determination of the extinction coefficient for these two types of double bonds, the following two compounds have been used: 1-decene for vinyl and trans-4-decene for trans-vinylene, and the procedure as described in ASTM-D6248-98 was followed with above the mentioned exception.

The total amount of vinyl bonds, vinylidene bonds and trans-vinylene double bonds of "the polymer" was analysed by means of IR spectrometry and given as the amount of vinyl bonds, vinylidene bonds and trans-vinylene bonds per 1000 carbon atoms.

Further, the total amount of vinyl and trans-vinylene double bonds of "the composition", with a possible contribution of double bonds from any used unsaturated low molecular weight compound (iii), may also be analysed by means of IR spectrometry and given as the amount of vinyl bonds, vinylidene bonds and trans-vinylene bonds per 1000 carbon atoms.

The composition or polymer to be analysed were pressed to thin films with a thickness of 0.5-1.0 mm. The actual thickness was measured. FT-IR analysis was performed on a Perkin Elmer Spectrum One. Two scans were recorded with a resolution of 4 $cm^{-1}$.

A base line was drawn from 980 $cm^{-1}$ to around 840 $cm^{-1}$. The peak heights were determined at around 910 $cm^{-1}$ for vinyl and around 965 $cm^{-1}$ for trans-vinylene. The amount of double bonds/1000 carbon atoms was calculated using the following formulae:

$$\text{vinyl}/1000C\text{-atoms} = (14 \times \text{Abs})/(13.13 \times L \times D)$$

$$\text{trans-vinylene}/1000C\text{-atoms} = (14 \times \text{Abs})/(15.14 \times L \times D)$$

wherein

Abs: absorbance (peak height)
L: film thickness in mm
D: density of the material (g/cm³)

The molar absorptivity, $\varepsilon$, i.e. 13.13 and, 15.14, respectively, in the above calculations was determined as $l \cdot mol^{-1} \cdot mm^{-1}$ via:

$$\varepsilon = \text{Abs}/(C \times L)$$

where Abs is the maximum absorbance defined as peak height, C the concentration ($mol \cdot l^{-1}$) and L the cell thickness (mm).

For polymers with a polar comonomer content >0.4% determination of unsaturated groups might be disturbed by neighbouring FTIR peaks. An alternative baseline approach may yield a more accurate representation of the unsaturated group content. Overall estimation of small peaks close to larger peaks could lead to an underestimation. Alternative base line positions could be 880 and 902 $cm^{-1}$ for vinyl, 902 and 920 $cm^{-1}$ for vinylidene, and 954 and 975 $cm^{-1}$. For higher unsaturated group content the base lines for vinyl and vinylidene could be combined.

The methods ASTM D3124-98, and ASTM D6248-98, include on the other hand also a procedure to determine the molar extinction coefficient. At least three 0.18 $mol \cdot l^{-1}$ solutions in carbon disulphide ($CS_2$) were used and the mean value of the molar extinction coefficient used.

The amount of vinyl groups originating from the polyunsaturated comonomer per 1000 carbon atoms was determined and calculated as follows:

The polymer to be analysed and a reference polymer have been produced on the same reactor, basically using the same conditions, i.e. similar peak temperatures, pressure and production rate, but with the only difference that the polyunsaturated comonomer is added to the polymer to be analysed and not added to reference polymer. The total amount of vinyl groups of each polymer was determined by FT-IR measurements, as described herein. Then, it is assumed that the base level of vinyl groups, i.e. the ones formed by the process and from chain transfer agents resulting in vinyl groups (if present), is the same for the reference polymer and the polymer to be analysed with the only exception that in the polymer to be analysed also a polyunsaturated comonomer is added to the reactor. This base level is then subtracted from the measured amount of vinyl groups in the polymer to be analysed, thereby resulting in the amount of vinyl groups/1000 C-atoms, which result from the polyunsaturated comonomer.

The Methods ASTM D3124-98, and ASTM D6248-98, Include a Calibration Procedure for Measuring the Double Bond Content of an Unsaturated Low Molecular Weight Compound (iii), if Present (Referred Below as Compound)

The molar absorptivity for Compound (e.g. a crosslinking booster or a scorch retarder compound as exemplified in the description) can be determined with said methods according to ASTM D6248-98. At least three solutions of the Compound in $CS_2$ (carbon disulfide) are prepared. The used concentrations of the solutions are close to 0.18 mol/l. The solutions are analysed with FTIR and scanned with resolution 4 $cm^{-1}$ in a liquid cell with path length 0.1 mm. The maximum intensity of the absorbance peak that relates to the unsaturated moiety of the Compound(s) (each type of carbon-carbon double bonds present) is measured.

The molar absorptivity, $\varepsilon$, in $l \cdot mol^{-1} \cdot mm^{-1}$ for each solution and type of double bond is calculated using the following equation:

$$\varepsilon = (1/CL) \times \text{Abs}$$

C=concentration of each type of carbon-carbon double bond to be measured, mol/l
L=cell thickness, mm
Abs=maximum absorbance (peak height) of the peak of each type of carbon-carbon double bond to be measured, mol/l.

The average of the molar absorptivity, $\varepsilon$, for each type of double bond is calculated. Further, the average molar absorptivity, $\varepsilon$, of each type of carbon-carbon double bond can then be used for the calculation of the concentration of double bonds in the reference polymer and the polymer samples to be analysed.

Rheology, Dynamic (Viscosity) Method ISO 6721-1:

Dynamic rheological properties of the polymer, here the polyethylene, or of the polymer composition (also measured on the polyethylene) may be determined using a controlled stress rheometer, using a parallel-plate geometry (25 mm diameter) and a gap of 1.8 mm between upper and bottom plates. Previous to test, samples need to be stabilized by dry blending pellets together with 0.25-0.3% Irganox B225. Irganox B 225 is a blend of 50% Irganox 1010, Pentaerythritol tetrakis(3-(3,5-di-tert-butyl-4-hydroxyphenyl)propionate), CAS-no. 6683-19-8 and 50% Irgafos 168, Tris(2,4-di-tert-butylphenyl) phosphite, CAS-no. 31570-04-4. Note that to add an antioxidant, here Irganox B225, is normally not the standard procedure of method ISO 6721-1.

A compression moulding process is performed using the following conditions: The pellets are melted for 2 minutes at 190° C. at any pressure and thereafter with a load of 100 kg/cm$^2$ during 2 min. After pressing, the material is allowed to cool to room temperature still under pressure for 30 minutes. The final thickness of the plaques is 1.8 mm.

Frequency sweep test, i.e. the "Rheology, dynamic (Viscosity) method", was performed according to the ISO standard method, ISO 6721-1 with an angular frequency range from 500 to 0.02 rad/s. All experiments were conducted under nitrogen atmosphere at a constant temperature of 190° C. and strain within the linear viscoelastic region. During analysis, storage modulus (G"), loss modulus (G"), complex modulus (G*) and complex viscosity ($\eta$*) were recorded and plotted versus frequency (w). The measured values of complex viscosity ($\eta$*) at angular frequency of 0.05, 100 and 300 rad/s are taken from test. The abbreviation of these parameters are $\eta_{0.05}$*, $\eta_{100}$* and $\eta_{300}$* respectively.

The zero viscosity $\eta$*$_0$ value is calculated using Carreau-Yasuda model. For cases when the use of this model for the estimation of the Zero shear viscosity is not recommendable, a rotational shear test at low shear rate is performed. This test is limited to a shear rate range of 0.001 to 1 s$^{-1}$ and a temperature of 190° C.

Preparation of Cable, i.e. Cable Core, i.e. Cable Obtained Using the Polyethylene of the Present Invention and Comparative Cable Polymer pellets of the test polymer compositions, i.e. polymer composition comprised in the cable according to the present invention and polymer composition comprised in the comparative cable were used to produce cables, i.e. cable cores, i.e. cable obtained using the polyethylene of the present invention and comparative cable, on a Maillefer pilot cable line of catenary continuous vulcanizing (CCV) type. The polymer pellets comprise polyethylene, antioxidant(s) and a crosslinking agent, here peroxide. The produced cables have 9.5 mm nominal insulation thickness obtained from the polymer composition or from comparative polymer composition, and an inner semiconducting layer, which is 1.0 mm thick, and an outer semiconducting layer which is 1.0 mm thick. The conductors of the cable cores have a cross section being 50 mm$^2$ of stranded aluminium. The cables, i.e. cable cores, were produced by extrusion via a triple head. The curing tube is composed of 4 zones (Z1, Z2, Z3 and Z4) and the temperature used in each zone for the cable extrusion were as follow: Z1=310° C., Z2=300° C., Z3=290° C. and Z4=290° C. The semiconducting material, i.e. a semiconducting composition, used as the inner and outer semiconducting material was LE0592 (a commercially semiconducting material supplied by *Borealis*).

The cable cores were produced with a line speed of 1.5 m/min when the polymer pellets of the insulation layer contained dicumylperoxide (DCP) as peroxide.

For hot set elongation determination, i.e. the method for Hot Set Determination, samples are taken from the middle of the insulation layer of the cable core, i.e. from the crosslinked cable according to the present invention and also from a crosslinked comparative cable. I.e. a dumbbell of a test material with a thickness of 1 mm, i.e. of the hot set elongation determination samples, is equipped with a weight corresponding to 20 N/cm$^2$.

Hot Set Method for Sample from Cable, i.e. Cable Core, i.e. Cable Obtained Using the Polyethylene of the Present Invention and Comparative Cable The hot set elongation as well as the permanent deformation were determined on samples taken from the middle of the insulation layer of the cable core, i.e. layer(s) from the crosslinked cable according to the present invention and also from a crosslinked comparative cable, prepared as described herein under "Preparation of cable core". These properties were determined according to IEC 60811-507:2012. In the hot set test, a dumbbell, i.e. a sample specimen, of the tested material is equipped with a weight corresponding to 20 N/cm$^2$. Firstly, all the sample specimens are marked with reference lines. From the middle of each sample specimen, two reference lines (one on each side) are made. The distance between the two lines, L0 is 20 mm. The sample specimen is put into an oven at 200° C. with the weight corresponding to 20 N/cm$^2$ and after 15 minutes, the hot set elongation is measured as follow. The distance between references line after 15 min at 200° C. is called L1 and is measured. Then the elongation after 15 min is calculated as follows: hot set elongation (%)=((L1*100)/L0)−100. Subsequently, the weight is removed and the sample specimen is allowed to relax for 5 minutes at 200° C. Then, the sample specimen is taken out from the oven and is cooled down to room temperature. After cooling, the distance L2 between the 2 reference lines is measured and the permanent deformation is calculated as follow: permanent deformation (%)=(L2*100)/L0)−100.

The dumbbells, i.e. the sample specimens, are prepared from the middle of the insulation layer of the cable core according to IEC 60811-501:2012 and have a thickness of 1 mm.

Evaluation of Sagging Resistance of the Cable, i.e. Cable Core, i.e. Cable Obtained Using the Polyethylene of the Present Invention and Comparative Cable—the Cable is Prepared as Under "Preparation of Cable" Herein The cable core was cut to smaller pieces with a band saw and the conductor was removed. The cable core sample was then sliced in approximately 0.5 mm thick slices and the thickness of the insulation layer was measured using a microscope. The part of the insulation layer having the largest difference between the thickest and the thinnest parts was identified and was used as a measure of the sagging resistance.

EXPERIMENTAL PART

Examples

The polyethylenes are all low density polyethylenes polymerised in a continuous high pressure tubular reactor.

Inventive Example 1: Polymer 1, i.e. Polyethylene in Accordance with the Present Invention, i.e. Poly (Ethylene-Co-1,7-Octadiene) Polymer with 0.71 Vinyl Groups/1000 Carbon Atoms (C), Density=922.3 kg/m³, $MFR_2$=0.68 g/10 Min)

Ethylene with recycled CTA was compressed in a 5-stage precompressor and a 2-stage hyper compressor with intermediate cooling to reach initial reaction pressure of ca 2900 bar. The total compressor throughput was ca 30 tons/hour. In the compressor area approximately 1.2 kg/hour of propion aldehyde (PA, CAS number: 123-38-6) was added together with approximately 87 kg propylene/hour as chain transfer agents to maintain an $MFR_2$ of 0.68 g/10 min. Here also 1,7-octadiene was added to the reactor in amount of 56 kg/h. The compressed mixture was heated to 164° C. in a preheating section of a front feed three-zone tubular reactor with an inner diameter of ca 40 mm and a total length of 1200 meters. A mixture of commercially available peroxide radical initiators dissolved in isododecane was injected just after the preheater in an amount sufficient for the exothermal polymerisation reaction to reach peak temperatures of ca 277° C. after which it was cooled to approximately 206° C. The subsequent $2^{nd}$ and $3^{rd}$ peak reaction temperatures were 270° C. and 249° C. respectively with a cooling in between to 217° C. The reaction mixture was depressurised by a kick valve, cooled and the resulting polymer 1 was separated from unreacted gas.

Inventive Example 2: Polymer 2, i.e. Polyethylene in Accordance with the Present Invention, i.e. Poly (Ethylene-Co-1,7-Octadiene) Polymer with 1.28 Vinyl Groups/1000 C, Density=923.5, $MFR_2$=0.80 g/10 Min)

Ethylene with recycled CTA was compressed in a 5-stage precompressor and a 2-stage hyper compressor with intermediate cooling to reach initial reaction pressure of ca 2800 bar. The total compressor throughput was ca 30 tons/hour. In the compressor area approximately 2.2 kg/hour of propion aldehyde (PA, CAS number: 123-38-6) was added together with approximately 41 kg propylene/hour as chain transfer agents to maintain an $MFR_2$ of 0.8 g/10 min. Here also 1,7-octadiene was added to the reactor in amount of 114 kg/h. The compressed mixture was heated to 159° C. in a preheating section of a front feed three-zone tubular reactor with an inner diameter of ca 40 mm and a total length of 1200 meters. A mixture of commercially available peroxide radical initiators dissolved in isododecane was injected just after the preheater in an amount sufficient for the exothermal polymerisation reaction to reach peak temperatures of ca 269° C. after which it was cooled to approximately 213° C. The subsequent $2^{nd}$ and $3^{rd}$ peak reaction temperatures were 262° C. and 234° C. respectively with a cooling in between to 210° C. The reaction mixture was depressurised by a kick valve, cooled and the resulting polymer 2 was separated from unreacted gas.

Inventive Example 3: Polymer 3, i.e. Polyethylene in Accordance with the Present Invention, i.e. Poly(Ethylene-Co-1,7-Octadiene) Polymer with 1.36 Vinyl Groups/1000 C, Density=922.4 kg/m³, $MFR_2$=1.13 g/10 Min)

Ethylene with recycled CTA was compressed in a 5-stage precompressor and a 2-stage hyper compressor with intermediate cooling to reach initial reaction pressure of ca 2800 bar. The total compressor throughput was ca 30 tons/hour. In the compressor area approximately 0.3 kg/hour of propion aldehyde (PA, CAS number: 123-38-6) was added together with approximately 43 kg propylene/hour as chain transfer agents to maintain an $MFR_2$ of 1.13 g/10 min. Here also 1,7-octadiene was added to the reactor in amount of 132 kg/h. The compressed mixture was heated to 155° C. in a preheating section of a front feed three-zone tubular reactor with an inner diameter of ca 40 mm and a total length of 1200 meters. A mixture of commercially available peroxide radical initiators dissolved in isododecane was injected just after the preheater in an amount sufficient for the exothermal polymerisation reaction to reach peak temperatures of ca 279° C. after which it was cooled to approximately 206° C. The subsequent 2nd and 3rd peak reaction temperatures were 272° C. and 245° C. respectively with a cooling in between to 217° C. The reaction mixture was depressurised by a kick valve, cooled and the resulting polymer 3 was separated from unreacted gas.

Inventive Example 4: Polymer 4, i.e. Polyethylene in Accordance with the Present Invention, i.e. Poly (Ethylene-Co-1,7-Octadiene) Polymer with 0.89 Vinyl Groups/1000 C, Density=923.7 kg/m³, $MFR_2$=0.92 g/10 Min)

Ethylene with recycled CTA was compressed in a 5-stage precompressor and a 2-stage hyper compressor with intermediate cooling to reach initial reaction pressure of ca 2800 bar. The total compressor throughput was ca 30 tons/hour. In the compressor area approximately 3.8 kg/hour of propion aldehyde (PA, CAS number: 123-38-6) was added as chain transfer agents to maintain an $MFR_2$ of 0.92 g/10 min. Here also 1,7-octadiene was added to the reactor in amount of 89 kg/h. The compressed mixture was heated to 162° C. in a preheating section of a front feed three-zone tubular reactor with an inner diameter of ca 40 mm and a total length of 1200 meters. A mixture of commercially available peroxide radical initiators dissolved in isododecane was injected just after the preheater in an amount sufficient for the exothermal polymerisation reaction to reach peak temperatures of ca 286° C. after which it was cooled to approximately 231° C. The subsequent 2nd and 3rd peak reaction temperatures were 274° C. and 248° C. respectively with a cooling in between to 222° C. The reaction mixture was depressurised by a kick valve, cooled and the resulting polymer 4 was separated from unreacted gas.

Inventive Example 5: Polymer 5, i.e. Polyethylene in Accordance with the Present Invention, i.e. Poly (Ethylene-Co-1,7-Octadiene) Polymer with 1.33 Vinyl Groups/1000 C, Density=924.3 kg/m³, $MFR_2$=0.94 g/10 Min)

Ethylene with recycled CTA was compressed in a 5-stage precompressor and a 2-stage hyper compressor with intermediate cooling to reach initial reaction pressure of ca 2800 bar. The total compressor throughput was ca 30 tons/hour. In the compressor area approximately 2.3 kg/hour of propion aldehyde (PA, CAS number: 123-38-6) was added as chain transfer agents to maintain an $MFR_2$ of 0.94 g/10 min. Here also 1,7-octadiene was added to the reactor in amount of 144 kg/h. The compressed mixture was heated to 160° C. in a preheating section of a front feed three-zone tubular reactor with an inner diameter of ca 40 mm and a total length of 1200 meters. A mixture of commercially available peroxide radical initiators dissolved in isododecane was injected just after the preheater in an amount sufficient for the exothermal polymerisation reaction to reach peak temperatures of ca 274° C. after which it was cooled to approximately 207° C. The subsequent 2nd and 3rd peak reaction temperatures were 257° C. and 227° C. respectively with a cooling in between to 211° C. The reaction mixture was depressurised by a kick valve, cooled and the resulting polymer 5 was separated from unreacted gas.

Inventive Example 6: Polymer 6, i.e. Polyethylene in Accordance with the Present Invention, i.e. Poly (Ethylene-Co-1,7-Octadiene) Polymer with 1.34 Vinyl Groups/1000 C, Density=924.9 kg/m³, MFR$_2$=1.46 g/10 Min Ethylene with recycled CTA was compressed in a 5-stage precompressor and a 2-stage hyper compressor with intermediate cooling to reach initial reaction pressure of ca 2800 bar. The total compressor throughput was ca 30 tons/hour. In the compressor area approximately 3.9 kg/hour of propion aldehyde (PA, CAS number: 123-38-6) was added as chain transfer agent to maintain an MFR$_2$ of 1.46 g/10 min. Here also 1,7-octadiene was added to the reactor in amount of 148 kg/h. The compressed mixture was heated to 159° C. in a preheating section of a front feed three-zone tubular reactor with an inner diameter of ca 40 mm and a total length of 1200 meters. A mixture of commercially available peroxide radical initiators dissolved in isododecane was injected just after the preheater in an amount sufficient for the exothermal polymerisation reaction to reach peak temperatures of ca 273° C. after which it was cooled to approximately 207° C. The subsequent $2^{nd}$ and $3^{rd}$ peak reaction temperatures were 257° C. and 226° C. respectively with a cooling in between to 209° C. The reaction mixture was depressurised by a kick valve, cooled and the resulting polymer 6 was separated from unreacted gas.

Comparative Example 1: Comparative Polymer 1, i.e. Polyethylene Polymer with 0.29 Vinyl Groups/1000 C, Density=not Measured, MFR$_2$=0.78 g/10 Min)

Ethylene with recycled CTA was compressed in a 5-stage precompressor and a 2-stage hyper compressor with intermediate cooling to reach initial reaction pressure of ca 2600 bar. The total compressor throughput was ca 30 tons/hour. In the compressor area approximately 3.6 kg/hour of propion aldehyde (PA, CAS number: 123-38-6) was added together with approximately 91 kg propylene/hour as chain transfer agents to maintain an MFR$_2$ of 0.78 g/10 min. The compressed mixture was heated to 166° C. in a preheating section of a front feed three-zone tubular reactor with an inner diameter of ca 40 mm and a total length of 1200 meters. A mixture of commercially available peroxide radical initiators dissolved in isododecane was injected just after the preheater in an amount sufficient for the exothermal polymerisation reaction to reach peak temperatures of ca 279° C. after which it was cooled to approximately 227° C. The subsequent $2^{nd}$ and $3^{rd}$ peak reaction temperatures were 273° C. and 265° C. respectively with a cooling in between to 229° C. The reaction mixture was depressurised by a kick valve, cooled and the resulting comparative polymer 1 was separated from unreacted gas.

Comparative Example 2: Comparative Polymer 2, i.e. Polyethylene Polymer with 0.37 Vinyl Groups/1000 C, Density=not Measured, MFR$_2$=2.07 g/10 Min)

Ethylene with recycled CTA was compressed in a 5-stage precompressor and a 2-stage hyper compressor with intermediate cooling to reach initial reaction pressure of ca 2600 bar. The total compressor throughput was ca 30 tons/hour. In the compressor area approximately 4 kg/hour of propion aldehyde (PA, CAS number: 123-38-6) was added together with approximately 119 kg propylene/hour as chain transfer agents to maintain an MFR$_2$ of 2.07 g/10 min. The compressed mixture was heated to 166° C. in a preheating section of a front feed three-zone tubular reactor with an inner diameter of ca 40 mm and a total length of 1200 meters. A mixture of commercially available peroxide radical initiators dissolved in isododecane was injected just after the preheater in an amount sufficient for the exothermal polymerisation reaction to reach peak temperatures of ca 276° C. after which it was cooled to approximately 221° C. The subsequent $2^{nd}$ and $3^{rd}$ peak reaction temperatures were 271° C. and 261° C. respectively with a cooling in between to 225° C. The reaction mixture was depressurised by a kick valve, cooled and the resulting comparative polymer 2 was separated from unreacted gas.

Comparative Example 3: Comparative Polymer 3, i.e. Polyethylene Polymer with 0.33 Vinyl Groups/1000 C, MFR$_2$=2.00 g/10 Min Ethylene with recycled CTA was compressed in a 5-stage precompressor and a 2-stage hyper compressor with intermediate cooling to reach initial reaction pressure of ca 2800 bar. The total compressor throughput was ca 30 tons/hour. In the compressor area approximately 3.8 kg/hour of propion aldehyde (PA, CAS number: 123-38-6) was added together with approximately 116 kg propylene/hour as chain transfer agents to maintain an MFR$_2$ of 2.00 g/10 min. The compressed mixture was heated to 169° C. in a preheating section of a front feed three-zone tubular reactor with an inner diameter of ca 40 mm and a total length of 1200 meters. A mixture of commercially available peroxide radical initiators dissolved in isododecane was injected just after the preheater in an amount sufficient for the exothermal polymerisation reaction to reach peak temperatures of ca 285° C. after which it was cooled to approximately 218° C. The subsequent 2nd and 3rd peak reaction temperatures were 285° C. and 259° C. respectively with a cooling in between to 230° C. The reaction mixture was depressurised by a kick valve, cooled and the resulting comparative polymer 3 was separated from unreacted gas.

Characterisation Data in Table 1 and Table 2

TABLE 1

|  | Polymer | MFR$_2$ (g/10 min) | $\eta^*_0$ (Pa s) | $\eta^*_{0.05}$ (Pa s) | $\eta^*_{300}$ (Pa s) |
|---|---|---|---|---|---|
| Inventive Example 1 | Polymer 1 | 0.68 | 47270 | 22290 | 337 |
| Inventive Example 2 | Polymer 2 | 0.80 | 42875 | 20345 | 338 |
| Inventive Example 3 | Polymer 3 | 1.13 | 31305 | 16305 | 292 |
| Inventive Example 4 | Polymer 4 | 0.92 | 41855 | 19985 | 321 |
| Inventive Example 5 | Polymer 5 | 0.94 | 39200 | 18715 | 316 |
| Inventive example 6 | Polymer 6 | 1.46 | 20670 | 12675 | 288 |
| Comparative example 1 | Comparative polymer 1 | 0.78 | 30860 | 20140 | 378 |
| Comparative example 2 | Comparative polymer 2 | 2.07 | 8767 | 7614.5 | 300 |
| Comparative example 3 | Comparative polymer 3 | 2.00 | 9097 | 7809 | 289 |

TABLE 2

| Material | Vinyl/1000 C | Vinylidene/1000 C | Trans-vinylene/1000 C |
|---|---|---|---|
| Inventive Example 1 | 0.71 | 0.17 | 0.08 |
| Inventive Example 2 | 1.28 | 0.15 | 0.12 |
| Inventive example 3 | 1.36 | 0.18 | 0.14 |
| Inventive example 4 | 0.89 | 0.19 | 0.10 |
| Inventive example 5 | 1.33 | 0.17 | 0.14 |
| Inventive example 6 | 1.34 | 0.17 | 0.14 |
| Comparative example 1 | 0.29 | 0.17 | 0.04 |
| Comparative example 2 | 0.37 | 0.17 | 0.04 |
| Comparative example 3 | 0.33 | 0.18 | 0.04 |

The Polymer Composition

Formulations, i.e. the polymer composition from which layer(s), e.g. insulation layer, comprised in the cable in accordance with the present invention, are obtained using the polyethylene of the present invention, crosslinking agent, and antioxidant were added as described herein and also comparative examples, have been prepared and compared. The same amounts of antioxidant with CAS Number 96-69-5 (4,4'-Thiobis (2-tert. butyl-5-methylphenol)) were added to the polyethylene of the invention and to the comparative polyethylenes. The crosslinking agent was added to the polyethylene by distributing the crosslinking agent (crosslinking agent is in a liquid form) at 70° C. onto the polyethylene pellets. The wet pellets were kept at 80° C. until the pellets became dry. The amount of crosslinking agent, e.g. peroxide, was selected for each polymer, i.e. "Inv. Cable Ex." 1-2 and "Comp. Cable Ex." 1-2, so that about the same crosslinking degree as measured by the method for Hot Set Determination (with a load of 20 N/cm$^2$) was achieved.

parative Examples 2-3 (see tables 1 and 2) and the Comparative cable Example 1 (see table 3), been shown to have both
- an improved sagging resistance illustrated by both the complex viscosity ($\eta^*$) at 0.05 rad/sec (see Table 1) and the "Sagging resistance, Difference, max-min" (see Table 3), as well as,
- an improved crosslinking degree illustrated by "Hot set elongation" (see Table 3).

Moreover, the polyethylene according to the present invention, as represented by the Inventive Examples 1-6 (see tables 1 and 2) and the Inventive cable Examples 1-2 (see table 3), has, in comparison with even other polyethylenes instead having a similar sagging resistance, again illustrated by both the complex viscosity ($\eta^*$) at 0.05 rad/sec (see Table 1) and the "Sagging resistance, Difference, max-min" (see Table 3), as represented by the Comparative polymer 1 (see tables 1 and 2) and Comparative cable Example 2 (see table 3), also shown

TABLE 3

|  |  | Inventive Cable Ex. 1 | Inventive Cable Ex. 2 | Comp. Cable Ex 1 | Comp. Cable Ex 2 |
|---|---|---|---|---|---|
| Polymer |  | Inventive Polymer 5 | Inventive Polymer 4 | Comparative polymer 3 | Comparative polymer 1 |
| MFR$_2$ | g/10 min | 0.94 | 0.92 | 2.00 | 0.78 |
| Vinyl |  | 1.33 | 0.89 | 0.33 | 0.29 |
| 4,4'-Thiobis (2-tert. butyl-5-methylphenol) content | wt. % | 0.2 | 0.2 | 0.2 | 0.2 |
| DCP content | wt. % | 0.75 | 1 | 1.8 | 1.95 |
| Sagging resistance |  |  |  |  |  |
| Average insulation thickness | mm | 9.5 | 9.6 | 9.6 | 9.6 |
| Difference, max-min | mm | 0.9 | 1.1 | 2.0 | 1.1 |
| max/min | — | 1.10 | 1.12 | 1.24 | 1.12 |
| Hot set elongation | % | 43.2 | 38.9 | 58.1 | 42.4 |
| Hot set permanent deformation | % | −3.2 | −3.3 | −2.3 | −2.9 |

The polyethylene according to the present invention, as represented by the Inventive Examples 1-6 (see tables 1 and 2) and the Inventive cable Examples 1-2 (see table 3), has, in comparison with other polyethylenes having a similar viscosity under processing conditions illustrated by complex viscosity ($\eta^*$) at 300 rad/sec, as represented by the Coman improved viscosity under processing conditions illustrated by complex viscosity ($\eta'$) at 300 rad/sec, as well as, a similar crosslinking degree illustrated by "Hot set elongation" (see Table 3).

Thus, the polyethylene according to the present invention, as defined herein, surprisingly combines in one polymer, i.e. in the polyethylene according to the present invention:

good processability (e.g. a good flowability), i.e. viscosity under processing conditions here illustrated by complex viscosity ($\eta^*$) at 300 rad/sec, which is generally only associated with polymers having a comparably higher $MFR_2$, with excellent sagging resistance, here illustrated by both the complex viscosity ($\eta^*$) at 0.05 rad/sec and the "Sagging resistance, Difference, max-min", generally only associated with polymers having a comparably lower $MFR_2$.

Moreover, the polyethylene, according to the present invention, has surprisingly also been shown to have an improved crosslinking degree illustrated by "Hot set elongation", in comparison with other polyethylenes having a comparably higher $MFR_2$.

The invention claimed is:

1. A polyethylene, characterized in that:
    the polyethylene contains a total amount of vinyl groups of from 0.89 to 1.34 per 1000 carbon atoms;
    the polyethylene has a complex viscosity ($\eta^*$) at 0.05 rad/sec, wherein the complex viscosity at 0.05 rad/sec is X Pas, and $X_1 \leq X \leq X_2$, wherein $X_1$ is 18500 and $X_2$ is 20000; and
    the polyethylene has a complex viscosity ($\eta^*$) at 300 rad/sec, wherein the complex viscosity at 300 rad/sec is Y Pas, and $Y_1 \leq Y \leq Y_2$, wherein $Y_1$ is 316 and $Y_2$ is 330;
    wherein both complex viscosities ($\eta^*$) are determined according to method ISO 6721-1 on stabilized samples of the polyethylene;
    wherein the polyethylene has a melt flow rate at 2.16 kg loading ($MFR_2$) of from 0.92 to 0.94 g/10 min, when determined according to method ISO 1133-1:2011 at 190° C.; and
    the polyethylene is an unsaturated low density polyethylene (LDPE) homopolymer or copolymer.

2. The polyethylene according to claim 1, wherein the polyethylene is a copolymer of:
    ethylene,
    at least one polyunsaturated comonomer, and
    zero or one or more other comonomer(s), and wherein the total amount of vinyl groups present in the polyethylene include vinyl groups originating from the at least one polyunsaturated comonomer.

3. The polyethylene according to claim 1, wherein the polyethylene is a copolymer of:
    ethylene, and
    at least one polyunsaturated comonomer,
    wherein the polyunsaturated comonomer is a straight carbon chain with at least 8 carbon atoms, at least two non-conjugated double bonds of which at least one is terminal, and at least 4 carbon atoms between the non-conjugated double bonds.

4. The polyethylene according to claim 1, the polyethylene is a copolymer of ethylene and 1,7-octadiene.

5. A polymer composition, which is crosslinkable or crosslinked, wherein the polymer composition comprises, or is obtained from, the polyethylene according to claim 1.

6. An article comprising the polyethylene according to claim 1.

7. The article according to claim 6, wherein the article is a power cable.

8. A process for producing the polyethylene according to claim 1, wherein the process comprises polymerizing ethylene optionally with one or more polyunsaturated comonomer(s).

9. A process for producing an article comprising the polyethylene of claim 1, wherein the process comprises producing the article from the polyethylene.

10. The process according to claim 9, wherein the article is a power cable and wherein the process comprises the steps:
    $a_0$) meltmixing the polyethylene, optionally together with further components;
    a) applying the meltmix obtained from step $a_0$) on a conductor to form at least one cable layer.

11. The process according to claim 10, wherein the article is a crosslinked power cable and wherein the process further comprises the step:
    b) crosslinking the at least one cable layer obtained from step a).

* * * * *